United States Patent
Oshima

(10) Patent No.: US 8,274,693 B2
(45) Date of Patent: Sep. 25, 2012

(54) MIXED JOBS GENERATION METHOD AND APPARATUS THEREOF

(75) Inventor: Keita Oshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1098 days.

(21) Appl. No.: 11/941,573

(22) Filed: Nov. 16, 2007

(65) Prior Publication Data

US 2008/0144091 A1    Jun. 19, 2008

(30) Foreign Application Priority Data

Dec. 13, 2006   (JP) .................. 2006-336383

(51) Int. Cl.
 *G06K 15/00* (2006.01)
 *G06F 3/12* (2006.01)
 *G06F 15/00* (2006.01)
 *G06K 1/00* (2006.01)
 *H04N 1/46* (2006.01)

(52) U.S. Cl. ...... 358/1.18; 358/1.1; 358/1.13; 358/1.15; 358/500

(58) Field of Classification Search .................. None
See application file for complete search history.

(56) References Cited

U.S. PATENT DOCUMENTS

| 5,933,576 A * | 8/1999 | Muramatsu .............. 358/1.1 |
| 7,104,709 B1 * | 9/2006 | Maher et al. .............. 400/76 |
| 2003/0159114 A1 | 8/2003 | Nishikawa et al. |

FOREIGN PATENT DOCUMENTS

| JP | 63-85559 | 4/1988 |
| JP | 9-207320 | 8/1997 |
| JP | 3294184 | 6/2002 |
| JP | 2003-296070 | 10/2003 |
| JP | 2004310725 A * | 11/2004 |

OTHER PUBLICATIONS

JP2004310725 abstract.*

* cited by examiner

*Primary Examiner* — Mark K Zimmerman
*Assistant Examiner* — Fan Zhang
(74) *Attorney, Agent, or Firm* — Fitzpatrick, Cella, Harper & Scinto

(57) ABSTRACT

Input data in which fixed data and variable data are mixed is processed in a system in which a plate offset press for processing fixed data and a plateless digital press capable of processing variable data are connected. A number of pages of fixed data to be printed in succession by the plate offset press is acquired. When the acquired number of pages of fixed data to be printed in succession by the plate offset press does not exceed a number of pages of fixed data to be printed in succession in the input data, a first job is generated to assign, for the plate offset press, pages of fixed data in the input data. A second job is generated to assign, for the plateless digital press, the remaining input data obtained by excluding the fixed data assigned for the plate offset press from the input data.

21 Claims, 38 Drawing Sheets

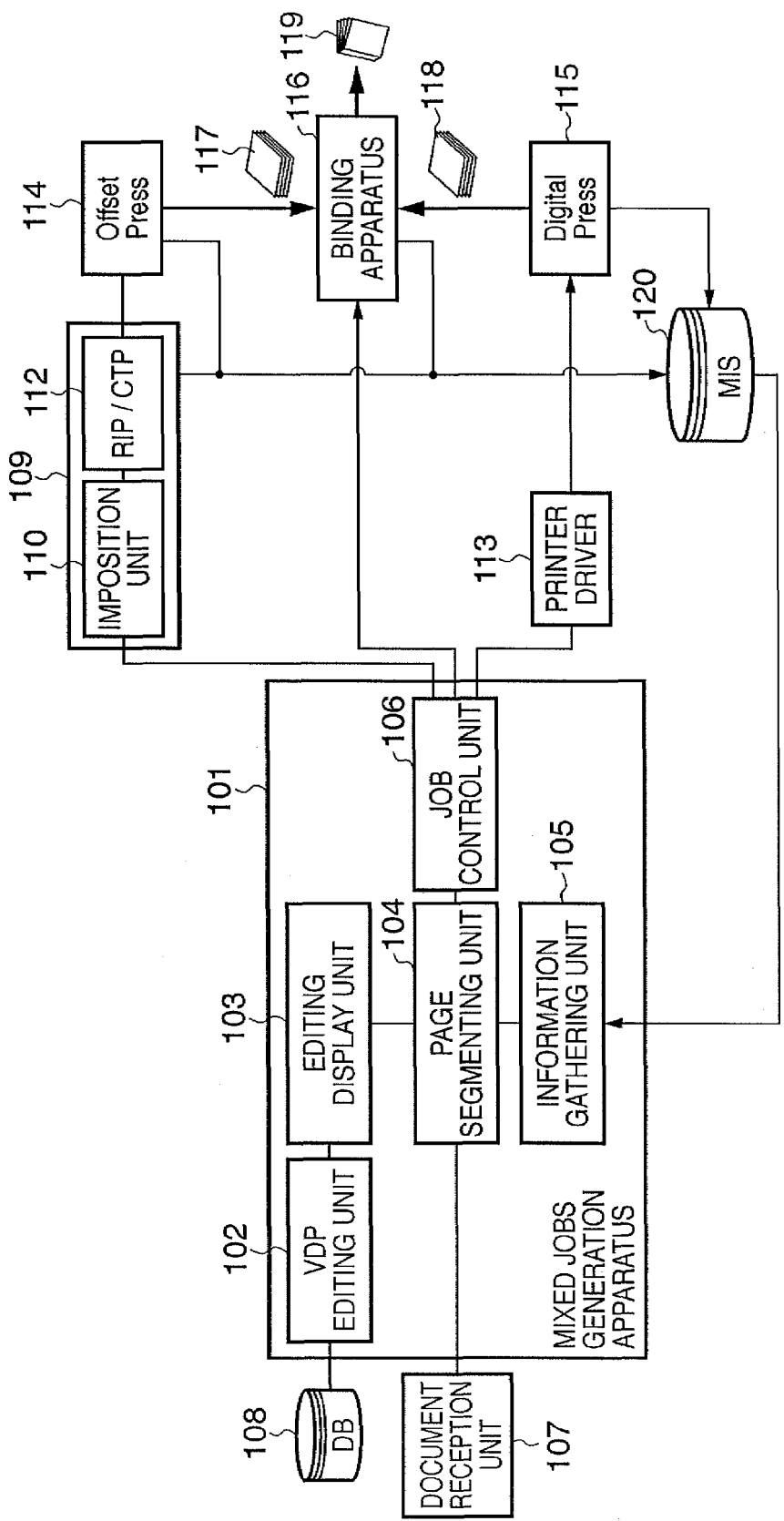

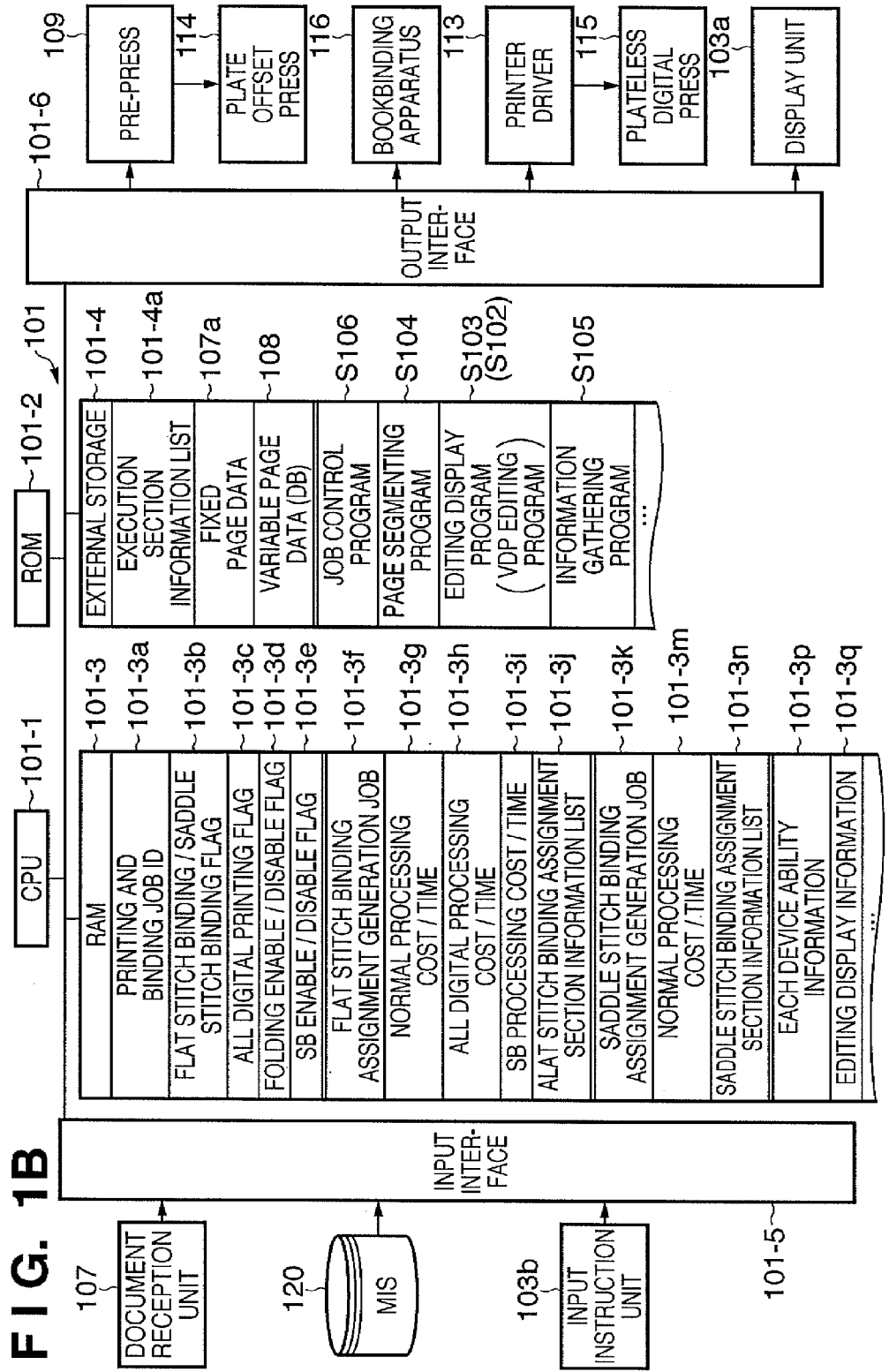

FIG. 1D

| DEVICE (ID) | ABILITY INFORMATION | PAGE COST / PLATE COST | ... |
|---|---|---|---|
| PRE-PRESS | | | |
| PLATE OFFSET PRESS | | | |
| PLATELESS DIGITAL PRESS | | | |
| BINDING APPARATUS | | | |
| ... | | | |

F I G. 10

1000

| | | | | | | | | |
|---|---|---|---|---|---|---|---|---|
| digital | | | 11 | 12 | # | 13 | 14 | |
| offset | 7 | 8 | 9 | 10 | # | 15 | 16 | 17 | 18 |
| digital | | | 5 | 6 | # | 19 | 20d | |
| digital | | | 3 | 4 | # | 21d | 22 | |
| digital | | | 1 | 2 | # | 23 | 24 | | offset : 8 pages, 1 section / digital 16 pages, 4 sections

FIG. 11

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| offset | 1 | 2 | | | | | | | | | | | | | | |
| digital | 17 | 18 | | | | | | | | | | | | | | |
| digital | 19 | 20d | | | | | | | | | | | | | | |
| digital | 21d | 22 | | | | | | | | | | | | | | |
| digital | 23 | 24 | | | | | | | | | | | | | | | offset : 16 pages, 1 section / digital 8 pages, 4 sections

1100

F I G. 12

| offset | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| digital | 17 | 18 | 19 | 20d | | | | | | | | | | | | |
| digital | 21d | 22 | 23 | 24 | | | | | | | | | | | | | offset : 16 pages, 1 section / digital 8 pages, 2 sections

| digital | | | 11 | 12d | # | 13 | 14 | | |
|---|---|---|---|---|---|---|---|---|---|
| digital | | | 9 | 10 | # | 15 | 16 | | |
| offset | 5 | 6 | 7 | 8 | # | 17 | 18 | 19 | 20 |
| digital | | | 3 | 4 | # | 21d | 22 | | |
| digital | | | 1d | 2 | # | 23 | 24 | | | offset : 8 pages, 1 section / digital 16 pages, 4 sections

F I G. 14

1400

| | | | | | | | | |
|---|---|---|---|---|---|---|---|---|
| digital | 1d | 2 | | | | | | |
| offset | 3 | 4 | 5 | 6 | 7 | 8 | 9 | 10 |
| digital | 11 | 12d | | | | | | |
| offset | 13 | 14 | 15 | 16 | 17 | 18 | 19 | 20 |
| digital | 21d | 22 | | | | | | |
| digital | 23 | 24 | | | | | | | offset : 16 pages, 2 sections / digital 8 pages, 4 sections

| digital | 1d  | 2   |     |     |     |     |     |
|---------|-----|-----|-----|-----|-----|-----|-----|
| offset  | 3   | 4   | 5   | 6   | 7   | 8   | 9   | 10 |
| digital | 11  | 12d |     |     |     |     |     |
| offset  | 13  | 14  | 15  | 16  | 17  | 18  | 19  | 20 |
| digital | 21d | 22  | 23  | 24  |     |     |     | offset : 16 pages, 2 sections / digital 8 pages, 3 sections

```
1   <JobTicket id="id_i0">
2      <pagedata filename="page-data-1.pdf"/>
3   </JobTicket>
```

```
1    <JobTicket id="id_o1">
2       <device name="offset"/>
3       <pagedata filename="Page-data-1.pdf"/>
4       <signature device="offset" id="sig1"
            page="1 2 3 4 5 6 7 8 9 10 11 12 13 14 15 16"/>
5    </JobTicket>
```

```
1    <JobTicket id="id_d2">
2      <device name="digital"/>
3      <pagedata filename="Page-data-1.pdf"/>
4      <signature device="digital" id="sig2" page="17 18 19 20"/>
5      <signature device="digital" id="sig3" page="21 22 23 24"/>
6    </JobTicket>
```

```
1    <JobTicket>
2        <device name="binder"/>
3        <bind type="stitching" joinlist="id_o1 id_o2"
         idlist="sig1 sig2 sig3"/>
4    </JobTicket>
```

MIXED JOBS GENERATION METHOD AND APPARATUS THEREOF

BACKGROUND OF THE INVENTION

1. Field of the Invention

The present invention relates to a mixed jobs generation method and an apparatus thereof. Particularly, the present invention relates to a mixed jobs generation method (and apparatus) for executing printing and binding (bookbinding) processing requested by a user by creating jobs using a combination of different types of printing and binding apparatuses. More particularly, the present invention relates to a storage medium storing a computer program for causing a computer to implement the mixed jobs generation method.

2. Description of the Related Art

Printed and bound products have conventionally been produced by plate offset printing such as offset printing. These days, plateless digital printing methods typified by electrophotographic printing are becoming popular in addition to the plate offset printing. Advantages of plate offset printing are low cost and high printing speeds in large-volume printing. However, in plate offset printing, printing and binding are done by the section gathering a set of pages, so the range of pages corresponding to each section must be determined before making plates. If the range of pages changes, all plates must be remade again.

On the other hand, one advantage of plateless digital printing is variable page printing capable of outputting different contents by the respective copies. This feature is represented by VDP (Variable Data Print).

A traditional printing company performs processing after switching the suitable printing method (plate offset printing or plateless digital printing) in accordance with the type of received order job from the beginning.

These printing methods take the following ideas to increase the processing efficiency.

Plate offset printing adopts a system which automatically performs pagination in order to achieve imposition by each section. Therefore, this system can efficiently create a layout in plate offset printing (see, e.g., Japanese Patent Laid-Open No. 63-085559).

Depending on the order receiving system of a printing and binding job in the current market, a part of received document data may not be determined until just before the document data is printed. To cope with this, there is a system capable of visually editing pagination and managing the progress of each page (see, e.g., Japanese Patent No. 3294184).

To the contrary, plateless digital printing can easily insert variable pages. An editing application which visually edits the output form can efficiently create a layout for output from a digital printer and divide a job (see, e.g., Japanese Patent Laid-Open No. 2003-296070 (FIG. 11)).

Recently, as the running costs of digital printing devices have decreased and their speeds have increased, even fixed pages but in a small number of copies can be printed at a lower cost and within a shorter delivery period by plateless digital printing than by plate offset printing. As plateless digital printing devices prevail, demand arises in the market for printing of different outputs by respective customers. As for this demand, however, not all pages of a printed and bound product contain variable printing elements. It may be disadvantageous for the cost and delivery period to process all pages as a plateless digital printing job on the grounds that plateless digital printing can execute variable printing. In contrast, plateless digital printing (though printing is not VDP) may be more advantageous than plate offset printing in terms of the cost and delivery period when printing some pages of received document data which are not determined until just before the document data is printed.

In plate offset printing, there is also proposed a method such as selective binding of inserting different section at the same collation position even when data contains a variable printing element (see, e.g., Japanese Patent Laid-Open No. 09-207320).

In this situation, a printing company must select whether to process a received order job by plate offset printing or plateless digital printing. The printing company is troubled about the trade-off between plate offset printing and plateless digital printing. Hence, there is a need for a method of generating mixed jobs that is efficient for both the cost and delivery period by utilizing the advantages of both plate offset printing and plateless digital printing. In other words, a user wishes to generate mixed jobs effective in reducing the cost and/or shortening the delivery period.

Generating efficient mixed jobs is achieved by generating printing and binding jobs so as to print pages for a large number of copies with fixed contents by plate offset printing as much as possible, to print pages with variable contents by plateless digital printing, and to combine these printed pages into one book. Alternatively, generating efficient mixed jobs is achieved by generating printing and binding jobs so as to print only a part of a printing and binding job by plateless digital printing when the part leads to cost reduction and shortening of the delivery period in comparison with plate offset printing.

However, according to the above-described conventional systems, when both plateless digital printing and plate offset printing are mixed, pages subjected to plateless digital printing must also be edited before pagination. That is, the progress of preparation of variable printing parts affects that of fixed printing parts. A plurality of pages are printed at once on one sheet for the section. Thus, the range of pages for the section must be determined not to contain any variable page requiring plateless digital printing. It is, therefore, difficult to generate mixed jobs for implementing a efficient combination of plate offset printing, plateless digital printing, and bookbinding in consideration of these factors.

For example, the pagination in plate offset printing is applicable to mixed jobs generation, which pagination is the premise of automatic pagination described in JPA 63-085559 or JPB 3294184. However, the section type is fixed in the pagination of plate offset printing. It is, therefore, difficult to generate efficient mixed jobs even if directly applying this pagination technique for the mixed jobs generation combining plateless digital printing.

An editing application which performs visual editing as described in JPA 2003-296070 can dynamically create the layout without any problem, that depends on the feature of plateless digital printing in which no plate is made. Therefore, even if the editing application is directly applied to the mixed jobs generation combining plate offset printing, it is difficult to generate efficient mixed jobs.

Problems in mixed jobs generation have been described above by examples of the mixed jobs generation using plate offset printing and plateless digital printing in printing and binding processing. However, problems in mixed jobs generation are not limited to them. These problems are common to even a general mixed jobs generation method, in which it can obtain an effective result of how to combine a plurality of processing methods having the same purpose, but a relation of trade off in cost reduction and/or shortening of the delivery period. The present invention indents to solve problems in a general mixed jobs generation method.

SUMMARY OF THE INVENTION

The present invention has been made to overcome the conventional drawbacks, and has as its object to provide a mixed jobs generation method of easily generating mixed jobs effective in cost reduction and/or shortening of the delivery period and an apparatus thereof.

More specifically, it is another object of the present invention to provide a mixed jobs generation method capable of distributing, to respective printing apparatuses, pages assigned to them and enhancing the operation of the printing apparatuses and an apparatus thereof.

To solve the above-described problems, according to the present invention, there is provided a method of generating mixed jobs for processing input data in which fixed data and variable data are mixed, in a system in which a first printing device for processing fixed data and a second printing device capable of processing variable data are connected, the method comprising the steps of: acquiring a number of pages of fixed data to be printed in succession by the first printing device; generating a first job which assigns, as print data of the first printing device, pages of fixed data to be printed in succession within input data in which fixed data and variable data are mixed, when a number of the pages of fixed data to be printed in succession in the input data exceeds the acquired number of pages of fixed data to be printed in succession by the first printing device; and generating a second job which assigns, as print data of the second printing device, remaining pages of the input data obtained by excluding the pages of fixed data assigned for the first printing device from the input data.

The first printing device includes a plate printing device, the second printing device includes a plateless printing device, data are processed for each print page, and print data for the first printing device includes plate data for making a press plate used in the first printing device, and the method further comprises the steps of: sequentially selecting a plurality of different segmentation methods for input print pages, executing, in accordance with the selected different segmentation methods, the first job generating step and the second job generating step, and selecting, from different combinations of the generated first and second jobs, a combination of the generated first and second jobs which satisfies a predetermined condition.

The plurality of segmentation methods include an segmentation method corresponding to saddle stitch binding of a printing result, and an segmentation method corresponding to flat stitch binding.

The method further comprises a step of selecting, in accordance with instruction of a user, a first processing from a first processing of selecting the segmentation method corresponding to the saddle stitch binding and the segmentation method corresponding to the flat stitch binding, and a second processing of designating either of the segmentation method corresponding to the saddle stitch binding or the segmentation method corresponding to flat stitch binding.

The plurality of segmentation methods include an segmentation method using a combination of the first and second jobs, and an segmentation method using only the second job.

The plurality of segmentation methods include an segmentation method when a selective binding function of inserting different sections at a same collation position is added to the first printing device, and an segmentation method when the selective binding function is not added.

The method further comprises the steps of: calculating frequency of change of print pages including variable data; and excluding a print page having a lowest frequency of change from variable print pages based on the calculation result, and performing the selective binding function for the print page.

The plate printing device and/or the plateless printing device has functions of performing double-sided printing of a plurality of print pages and forming a section for the plurality of print pages double-sided printed, and a number of pages printable on one sheet by the plate printing device is larger than a number of pages printable on one sheet by the plateless printing device.

In the step of selecting a combination which satisfies a predetermined condition, a combination which satisfies a lower cost and/or a shorter processing time is selected.

The input data in which fixed data and variable data are mixed is input by a job ticket of a predetermined first format, the first job and the second job are transferred by a job ticket of a predetermined second format, and a third job which designates control of a binding device for binding printouts from the plate printing device and the plateless printing device is transferred by a job ticket of a predetermined third format.

Also, there is provided a mixed jobs generation apparatus for processing input data in which fixed data and variable data are mixed, in a system in which a first printing device for processing fixed data and a second printing device capable of processing variable data are connected, comprising: acquiring unit adapted to acquire a number of pages of fixed data to be printed in succession by the first printing device; first generation unit adapted to generate a first job which assigns, as print data of the first printing device, pages of fixed data to be printed in succession within input data in which fixed data and variable data are mixed, when a number of the pages of fixed data to be printed in succession in the input data exceeds the acquired number of pages of fixed data to be printed in succession by the first printing device; and second generation unit adapted to generate a second job which assigns, as print data of the second printing device, remaining pages of the input data obtained by excluding the pages of fixed data assigned for the first printing device from the input data.

Further, there is provided a plateless printing apparatus or a pre-press apparatus which forms a plate of a plate printing device, including the mixed jobs generation apparatus mentioned above.

The present invention can easily generate mixed jobs effective in cost reduction and/or shortening of the delivery period.

The present invention can distribute, to respective printing apparatuses, pages assigned to them in print processing, and enhancing the operation of the printing apparatuses.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1A is a block diagram showing the overall configuration of a printing and binding system according to the first embodiment;

FIG. 1B is a block diagram showing an arrangement which implements a mixed jobs generation apparatus according to the embodiments;

FIG. 1D is a table showing an example of device ability information and operation log information held in a MIS according to the embodiments;

FIG. 10 is a table showing an example of page segmentation list as a result of the saddle stitch binding page assignment in FIG. 4;

FIG. 11 is a table showing an example of page segmentation list during flat stitch binding page assignment in FIG. 4;

FIG. 12 is a table showing an example of page segmentation list as a result of the flat stitch binding page assignment in FIG. 4;

FIG. 13 is a table showing an example of page segmentation list as a result of the saddle stitch binding page assignment in FIG. 5;

FIG. 14 is a table showing an example of page segmentation list during flat stitch binding page assignment in FIG. 5;

FIG. 15 is a table showing an example of page segmentation list as a result of the flat stitch binding page assignment in FIG. 5;

FIG. 30 is a view showing an example of a job ticket sent from a document reception unit to a page segmenting unit according to the sixth embodiment;

FIG. 31 is a view showing an example of a job ticket sent from the page segmenting unit to a plate offset printing device according to the sixth embodiment;

FIG. 32 is a view showing an example of a job ticket sent from the page segmenting unit to a plateless digital printing device according to the sixth embodiment;

FIG. 33 is a view showing an example of a job ticket sent from the page segmenting unit to a binding apparatus according to the sixth embodiment.

DESCRIPTION OF THE EMBODIMENTS

Figure 1C:
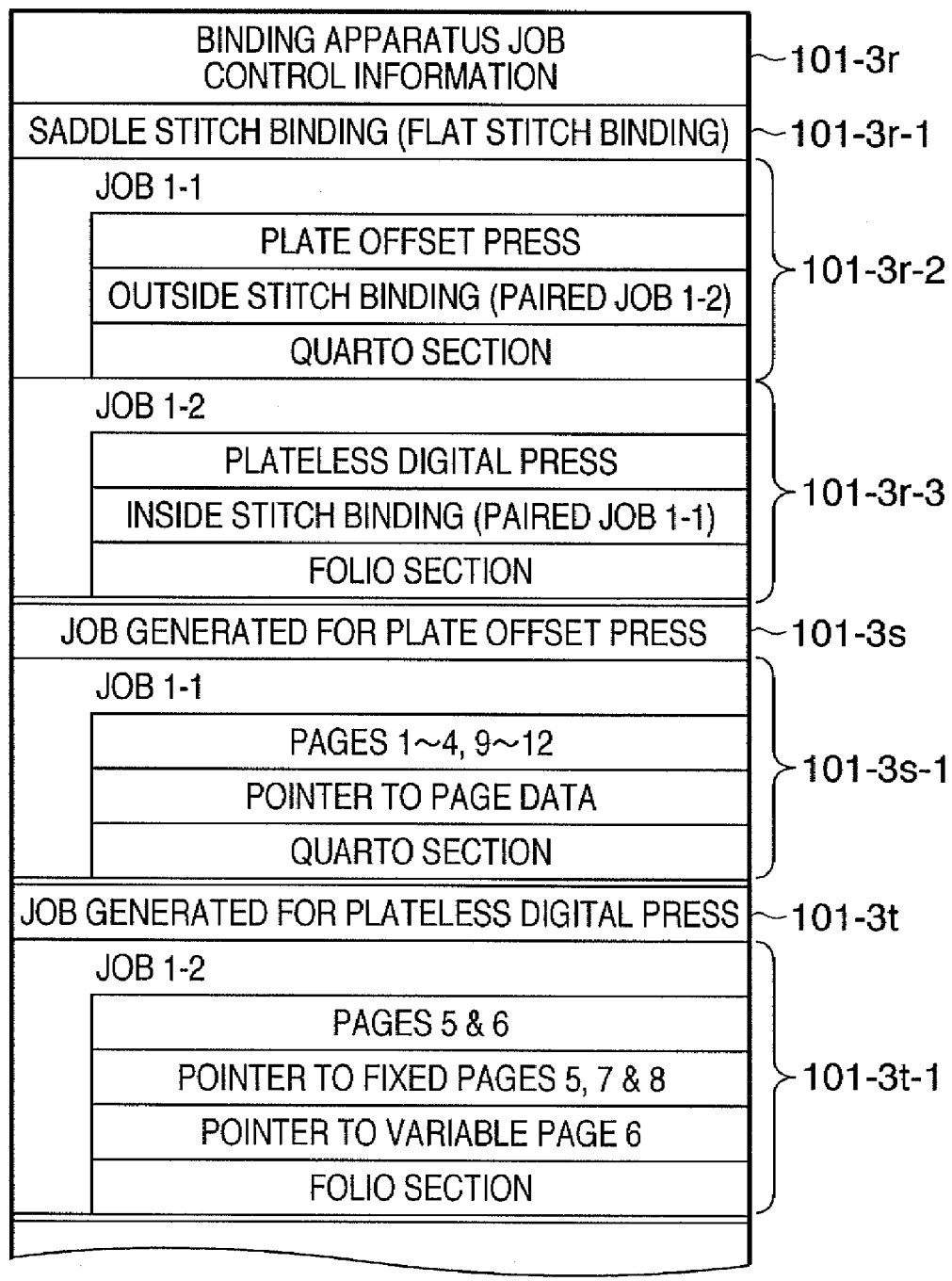
FIG. 1C is a view showing a structure of a job to each device according to the embodiments.

Preferred embodiments of the present invention will be described in detail below with reference to the accompanying drawings.

First Embodiment

A printing and binding system according to the first embodiment of the present invention will be described.

<Example of Overall Configuration of Printing and Binding System According to First Embodiment>

FIG. 1A is a block diagram showing a overall configuration of the printing and binding system according to the embodiments.

In FIG. 1A, a mixed jobs generation apparatus 101 is a main building component of the present invention. The mixed jobs generation apparatus 101 comprises a VDP editing unit 102, editing display unit 103, page segmenting unit 104, information gathering unit 105, and job control unit 106. Reference numeral 107 denotes a document reception unit; and 108, a database (DB) used for variable data printing.

A pre-press 109 performs pre-processing necessary for known plate offset printing. The pre-press 109 comprises an imposition unit 110 and plate making unit (RIP/CTP (Computer To Plate) unit) 112. The pre-press 109 is based on a known technique, and may comprise processing blocks in addition to the units 110 and 112. However, FIG. 1A illustrates the imposition unit 110 and plate making unit 112 as typical processing blocks relevant to the present invention.

The RIP/CTP unit 112 receives digital print information and controls a press plate making machine to make a press plate used in a plate offset printing device (an offset press 114 in FIG. 1A). For this purpose, the mixed jobs generation apparatus 101 also has a function of generating press plate data (e.g., PDF (Portable Document Format) or TIFF format) for making a press plate used in the plate offset printing device. The mixed jobs generation apparatus 101 may save generated press plate data as a file in a designated directory, or directly output press plate data to the pre-press 109.

A printer driver 113 generates a print job for driving a plateless printing device, e.g., plateless digital press 115 in FIG. 1A serving as an example of the second printing device capable of printing with variable data. A plate offset printing device, i.e., plate offset press 114 is an example of the first printing device which processes fixed data. The plate offset printing device 114 performs predetermined post-processing, and obtains sections of pages as an output. Similarly, the plateless digital printing device 115 can also obtain predetermined sections of pages as an output.

A press plate (copper plate) used in the plate offset printing device can be made by transmitting a press plate making job generated by the pre-press 109 to the plate offset printing device 114. In the first embodiment, the plate offset printing device 114 has a function of making a press plate. A press plate used in the plate offset printing device 114 may also be made by another press plate making machine in place of the plate offset printing device 114. In this case, the press plate making job is transmitted to the another press plate making machine.

Offset printing can be executed for a designated number of sheets by setting a prepared press plate on the transfer portion of the plate offset printing device 114. The plate offset printing device 114 can print on a print sheet by pressing the prepared press plate on it by a known technique. More specifically, the surface of a prepared press plate is processed to attain a hydrophilic portion and a hydrophobic portion. When water is poured over the entire press plate, the hydrophilic portion absorbs water and the hydrophobic portion repels water. Then, ink is applied to the press plate. The ink is repelled at the water-absorbing portion and comes off, but remains at only the water-free portion. The ink on the press plate is transferred once on a rubber called a blanket component. Printing is done by transferring the ink from the rubber onto paper serving as a print medium. This printing method is called offset printing.

A binding apparatus 116 binds a plurality of sections of pages. The binding apparatus 116 performs a plurality of post-processes such as stitch binding and cutting necessary for bookbinding. Reference numeral 117 denotes physical sections in a case where the plate offset printing device 114 transfers the physical sections to the binding apparatus 116. Reference numeral 118 denotes physical sections in a case where the plateless digital printing device 115 transfers the physical sections to the binding apparatus 116. Reference numeral 119 denotes a physical bound product (a book) in a case where the physical bound product is obtained as an output from the binding apparatus 116.

A MIS (Management Information System) 120 collects ability information and operation log information from the pre-press 109, plate offset printing device 114, plateless digital printing device 115, and binding apparatus 116. The MIS 120 provides the information gathering unit 105 with information for determining device ability and calculating the processing cost.

The mixed jobs generation apparatus according to the present invention may be one apparatus including the printer driver 113 and pre-press 109.

<Example of Arrangement of Mixed Jobs Generation Apparatus>

FIG. 1B is a block diagram showing an arrangement of the mixed jobs generation apparatus 101 according to the first embodiment. In FIG. 1B, the same reference numerals as those in FIG. 1A denote the same components, and a description thereof will not be repeated. A display unit 103a and input instruction unit 103b constitute the editing display unit 103 in FIG. 1A.

In FIG. 1B, a CPU 101-1 executing calculation and control controls the whole mixed jobs generation apparatus 101. A ROM 101-2 stores permanent programs and parameters. A RAM 101-3 is used as a temporary data storage when the CPU 101-1 executes a computer program. An external storage 101-4 such as a disk stores data such as print page data, a database, and an application program which is loaded into the RAM 101-3 and executed. An input interface 101-5 is connected to the input instruction unit 103b, the document reception unit 107 and MIS 120 in FIG. 1A. An output interface 101-6 is connected to the display unit 103a and the pre-press 109, binding apparatus 116, and printer driver 113 in FIG. 1A.

The following storage areas relevant to the first embodiment are reserved in the RAM 101-3. Only storage areas relevant to one printing and binding job are shown in the RAM 101-3 of FIG. 1B. FIG. 1B does not show storage areas less relevant to the first embodiment, general-purpose storage areas, and variables used in the following flowcharts.

An area 101-3a stores an ID for identifying a printing and binding job. The ID manages one printing and binding job. An area 101-3b stores a flag that represents the selected choice between either side stitch binding or saddle stitch binding in the first embodiment. An area 101-3c stores a flag that represents the selected choice between simultaneous use of plate offset printing and plateless digital printing or only plateless digital printing in the first embodiment. An area 101-3d stores a flag representing whether or not the plate offset printing device 114 (or plateless digital printing device 115) can perform folding in accordance with the sections. An area 101-3e stores a flag representing whether or not a selective binding (SB) function, which is adopted in the second embodiment, is available or performed.

An area 101-3f stores a job generated for the flat stitch binding assignment, and is managed by a new job ID. Areas 101-3g to 101-3i store calculated values to be compared in correspondence with selection conditions in flat stitch binding, and area 101-3j stores section information lists (see page segmentation lists in FIGS. 10 to 15) as a page assignment result. The area 101-3g stores the calculated values of the processing cost and processing time when pages are segmented for a combination of plate offset printing and plateless digital printing. The area 101-3h stores the calculated values of the processing cost and processing time when pages are segmented for only plateless digital printing. The area 101-3i stores the calculated values of the processing cost and processing time when pages are segmented in consideration of the selective binding (SB) function.

An area 101-3k stores a job generated for the saddle stitch binding assignment, and is managed by a new job ID. Areas 101-3m stores calculated values to be compared in correspondence with selection conditions in saddle stitch binding, and area 101-n stores section information lists (see FIGS. 10 to 15) as a page assignment result. The area 101-3m stores the calculated values of the processing cost and processing time when pages are segmented for a combination of plate offset printing and plateless digital printing.

An area 101-3p stores ability information of each device gathered by the information gathering unit 105 in FIG. 1A. An area 101-3q stores information corresponding to a display or editing instruction from the editing display unit 103 in FIG. 1A.

Although some of the parameters used in the following flowcharts are omitted for descriptive convenience, an area for these parameters (flags, variables, counts, and the like) is also reserved in the RAM 101-3.

The external storage 101-4 stores the following data and programs. FIG. 1B shows only data and computer programs relevant to the first embodiment in the RAM 101-3. FIG. 1B does not show data and computer programs less relevant to the first embodiment, and general-purpose data and computer programs.

An area 101-4a stores printing and binding section information lists (see FIGS. 10 to 15) selected as a result of processing in the first embodiment. Each device is so controlled as to generate the following job on the basis of the section information list and complete printing and binding. Fixed page data 107a is input from the document reception unit 107 in FIG. 1A. A database (DB) 108 stores variable page data, and corresponds to the DB 108 in FIG. 1A.

The reference numerals of the following computer programs with the prefix "S" correspond to respective elements with the same reference numerals in FIG. 1A. A job-control program S106 implements the job control unit 106. A page segmenting program S104 implements the page segmenting unit 104. An editing display program S103 includes a VDP editing program S102, and implements the editing display unit 103 and VDP editing unit 102. An information gathering program S105 implements the information gathering unit 105.

(Example of Control Information to Binding Apparatus, Plate Offset Printing Device, and Plateless Digital Printing Device)

FIG. 1C is a view showing an example of control information to the binding apparatus, plate offset printing device, and plateless digital printing device which is stored in the RAM 101-3 in FIG. 1B. Synchronized printing and binding are achieved by sending this information to the binding apparatus, plate offset printing device, and plateless digital printing device. This control information is merely an example in centralized control by the job control unit 106. It is also possible to send a section information list to the binding apparatus, plate offset printing device, and plateless digital printing device. In this case, each device analyzes it and operates based on the analyzed result. A storage area for the control information is also reserved in the RAM 101-3 in FIG. 1B.

Figure 3:
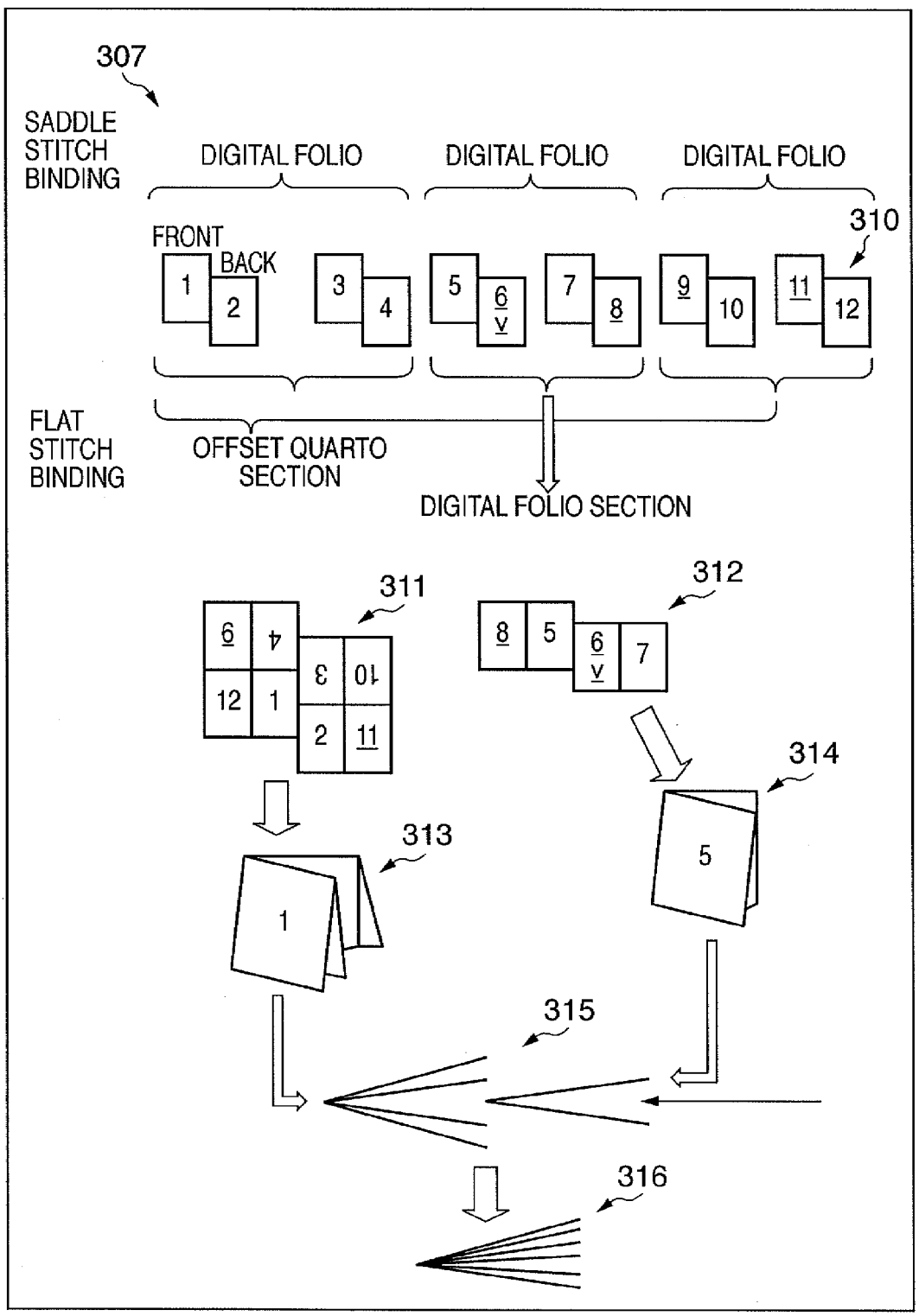
FIG. 3 is a view showing another example of page segmentation according to the embodiments.

FIG. 1C shows control information for saddle stitch binding exemplified in FIG. 3.

Binding apparatus job control information 101-3r is used to control the binding apparatus 116. The binding apparatus job control information 101-3r includes information 101-3r-1 representing saddle stitch binding or flat stitch binding. The binding apparatus job control information 101-3r includes information 101-3r-2 representing how to saddle-stitch print and make sections from the plate offset printing device 114 with those from the plateless digital printing device 115. A job ID 1-1 of the information 101-3r-2 coincides with a job ID 1-1 of job information to the plate offset printing device 114. The binding apparatus job control information 101-3r-3 includes information 101-3r-3 representing how to saddle-stitch print and make sections from the plateless digital printing device 115 with those from the plate offset printing device 114. A job ID 1-2 of the information 101-3r-3 coincides with a job ID 1-2 of job information to the plateless digital printing device 115.

A job 101-3s is generated to control the plate offset printing device 114. The job 101-3s plate offset printing device includes information 101-3s-1 on pages to be printed and the section type. The information 101-3s-1 includes a job ID 1-1, a list of page numbers to be printed (pages 1 to 4 and 9 to 12 in FIG. 1C, corresponding to segmentation in FIG. 3), a pointer from the page number to page data and section type information ("quarto" in FIG. 1C, corresponding to segmentation in FIG. 3).

A job 101-3t is generated to control the plateless digital printing device 115. The job 101-3t generated for the plateless digital printing device includes information 101-3t-1 on pages to be printed and the section type. The information 101-3t-1 includes a job ID 1-2, a list of page numbers to be printed (pages 5 to 8 in FIG. 1C, corresponding to segmentation in FIG. 3), a pointer from the page number to page data, and section type information ("folio" in FIG. 1C, corresponding to segmentation in FIG. 3).

The job generated for the plate offset printing device corresponds to the first job, and the job generated for the plateless digital printing device corresponds to the second job. Transfer of the jobs is replaced by transfer of job tickets in the sixth embodiment (to be described later).

(Example of Device Ability Information in MIS)

FIG. 1D is a table showing an example of device ability information collected from each device to the MIS 120 and provided to the information gathering unit 105. Ability information of each device is used to calculate the processing cost and time, select flat stitch binding or saddle stitch binding, and assign a job to the offset press and digital press in the embodiments. FIG. 1D shows only information relevant to the embodiments, but other processing ability information is also stored. FIG. 1D shows only the page cost/plate cost, but (the total number of print pages/total number of plates) and the total cost may also be stored.

In FIG. 1D, a column 120-1 stores the name of each device together with an ID. A column 120-2 stores ability information representing the ability of each device. The column 120-2 may store pieces of ability information. A column 120-3 stores the page cost for 1-page printing calculated from the operation log of each device, and the plate cost of each plate for the plate offset printing device. In the first embodiment, the column 120-3 also stores the page processing time of each page and the plate making time taken to make each plate.

In the first embodiment, pre-press information 120a, plate offset printing device information 120b, plateless digital printing device information 120c, and binding apparatus information 120d are stored in respective rows.

<Example of Overall Processing by Printing and Binding System According to Embodiments>

An example of processing by the printing and binding system having the configuration shown in FIG. 1A will be explained.

When a print job is entered via the document reception unit 107, the page segmenting unit 104 receives page data of contents serving as the input data. The editing display unit 103 cooperates with the VDP editing unit 102 to make settings for variable data printing of the page data. More specifically, the editing display unit 103 sets a variable printing area in a page and at a position in the page designated by the user. The editing display unit 103 associates the variable printing area with data held in the database 108. In this manner, input data containing both fixed data and variable data is generated.

The page segmenting unit 104 segments pages into sets of pages to plate offset printing and plateless digital printing. The job control unit 106 performs processes for issuing jobs corresponding to plate offset printing and plateless digital printing.

When pages are subjected to plate offset printing, a variable printing rendering object is added to page data of each page. In this case, the page data is represented in a format (e.g., PDF or TIFF) suitable for input to the pre-press 109. In plate offset printing, the added rendering object is laid out on a page for the press plate by the imposition unit 110, and rasterized by the RIP/CTP unit 112. The press plate print job obtained by rasterization is transmitted to the plate offset printing device 114 or the press plate-making machine (not shown), as described above.

When pages are subjected to plateless digital printing, a variable printing rendering object list is added to page data of each page. In this case, the page data is represented as data (e.g., PPML) for performing variable printing. In plateless digital printing, the plateless digital printing device 115 prints via the printer driver 113 in accordance with the association between the printing area and data. Assume in the embodiments that the printer driver 113 or plateless digital printing device 115 complies with a variable print data format such as PPML. PPML (Personalized Printing Markup Language) is an XML-based language compliant with variable printing. The standardization and popularization of PPML have been promoted by a nonprofit organization PODi (digital Print Initiative) which has been set up in USA and is active in Europe and the USA.

The editing display unit 103 checks a page which may be replaced with a page entered via the document reception unit 107.

The information gathering unit 105 gathers device information from the MIS 120.

The page segmenting unit 104 segments pages and assigns page data to the plate offset printing device and plateless digital printing device based on editing result information of the editing display unit 103 and information of the information gathering unit 105. Pages for plate offset printing out of the segmented pages are sent to the pre-press 109 via the job control unit 106, and pages for the plateless digital printing device are sent to the printer driver 113. As a result, mixed jobs are generated including the first job(s) for the plate offset printing device and the second job(s) for the plateless digital printing device.

The job control unit 106 instructs the binding apparatus 116 to bind sections outputted from the plate offset printing device 114 and plateless digital printing device 115 into one book.

The MIS 120 always collects ability information of connected devices such as the pre-press 109, plate offset printing device 114, plateless digital printing device 115, and binding apparatus 116. The MIS 120 sends device ability information in response to an inquiry from the information gathering unit 105. The MIS 120 calculates and holds the cost per page and the cost per plate based on the operation records of the connected devices. As for the cost information, the MIS 120 sends cost calculation information in response to an inquiry from the information gathering unit 105.

<Example of Page Segmentation by Mixed Jobs Generation Apparatus According to Embodiments>

Examples of page segmentation by the mixed jobs generation apparatus according to the embodiments will be described. In these examples, the procedures of the mixed jobs generation apparatus according to the embodiments are applied to some examples of combinations of pages. The present invention is not limited to these examples.

(Page Segmentation Example 1)

Figure 2:
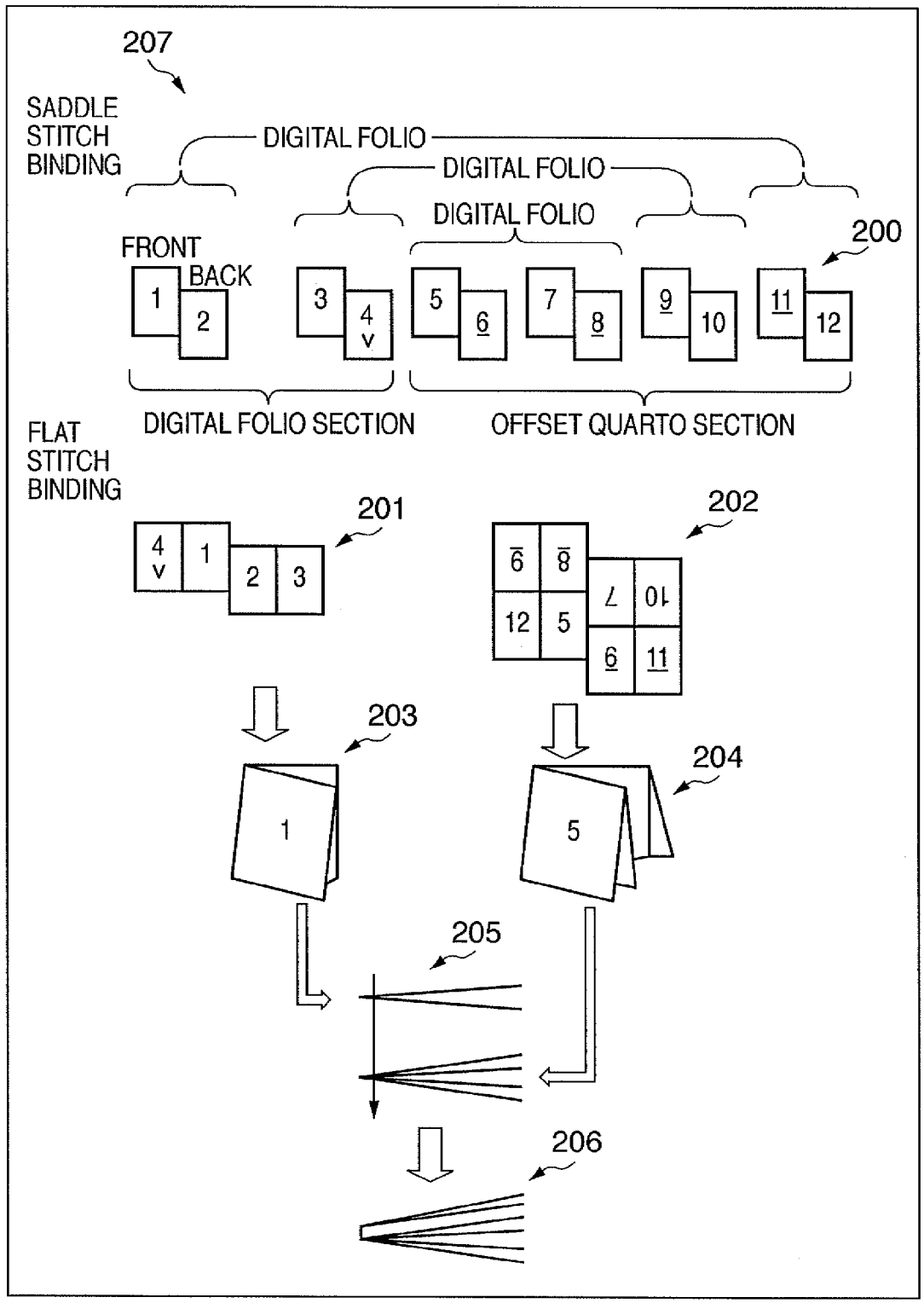
FIG. 2 is a view showing an example of page segmentation according to the embodiments.

FIG. 2 is a view showing an example of page segmentation according to the embodiments.

In FIG. 2, reference numeral 200 denotes page data before segmentation. FIG. 2 shows page data of 12 pages which assume double-sided printing. In the page data 200, numbers 1 to 12 represent page numbers. "1" represents the first page, and "12" represents the 12th page. A mark "V" attached to the 4th page means that the 4th page is subjected to variable printing. Other pages having no mark "V" are pages having fixed contents.

In FIG. 2, the page data 200 undergoes flat stitch binding in accordance with determination in the embodiments.

Reference numerals 201 and 202 denote impositions obtained by segmenting the page data 200 into two page groups and imposing the two page groups for plateless digital printing and plate offset printing. The 1st to 4th pages are combined into an imposition 201 for the plateless digital printing, and a sheet of these 4 pages is folded into folio. The 5th to 12th pages are combined into an imposition 202 for the plate offset printing, and a sheet of these 12 pages is folded into quarto. Reference numerals 203 and 204 denote sections each upon printing and folding these pages. Reference numeral 205 denotes a state in which the sections 203 and 204 are superposed for flat stitch binding. Reference numeral 206 denotes a resultant bound product. Flat stitch binding is executed after at least one edge (e.g., top edge) of the section 204 is cut.

Reference numeral 207 denotes a comparative example of performing saddle stitch binding for the page data 200 in FIG. 2. In saddle stitch binding, 4 pages printed sheets are superposed and the superposed result is folded into folio. Thus, pages must be imposed (laid out) such that bound pages are turned over in the ascending order of pages. In saddle stitch binding in FIG. 2, pages 1, 2, 11 and 12 are subjected to digital printing on a sheet and folio processing, pages 3, 4, 9, and 10 are subjected to digital printing on a sheet and folio processing, and pages 5 to 8 are subjected to digital printing on a sheet and folio processing.

(Page Segmentation Example 2)

FIG. 3 is a view showing another example of page segmentation.

In FIG. 3, reference numeral 310 denotes page data of 12 pages before segmentation. In the page data 310, variable printing is set at the 6th page.

In FIG. 3, the page data 310 undergoes saddle stitch binding in accordance with determination in the embodiments.

In FIG. 3, pages are segmented into an imposition 311 for the plate offset printing and an imposition 312 for the plateless digital printing. The 1st to 4th pages and 9th to 12th pages are combined as one page group into the imposition 311 for the plate offset printing, and a sheet of these 8 pages is folded into quarto. The 5th to 8th pages are combined into the imposition 312 for the plateless digital printing, and a sheet of these 4 pages is folded into folio. The folded result of the imposition 311 is a section 313, and the folded result of the imposition 312 is a section 314. Reference numeral 315 denotes a state in which the section 314 is inserted into the section 313, and they are saddle stitch bound. Reference numeral 316 denotes a resultant bound product. Saddle stitch binding is executed after at least one edge (e.g., top edge) of the section 313 is cut.

Reference numeral 307 denotes a comparative example of performing flat stitch binding for the page data 310 in FIG. 3. In flat stitch binding in FIG. 3, pages 1 to 4 are subjected to digital printing on a sheet and folio processing, pages 5 to 8 are subjected to digital printing on a sheet and folio processing, and pages 9 to 12 are subjected to digital printing on a sheet and folio processing.

The page segmenting unit 104 in FIG. 1A segments inputted pages into some sets of pages as shown in FIG. 2 or 3 in accordance with the position(s) of variable print page(s) which needs to be assigned to the plateless digital printing. At this time, the page segmenting unit 104 segments the inputted pages into some sets of pages in consideration of the binding method, and controls the binding apparatus 116 via the job control unit 106 to achieve appropriate bookbinding.

(Page Segmentation Example 3)

Figure 4:
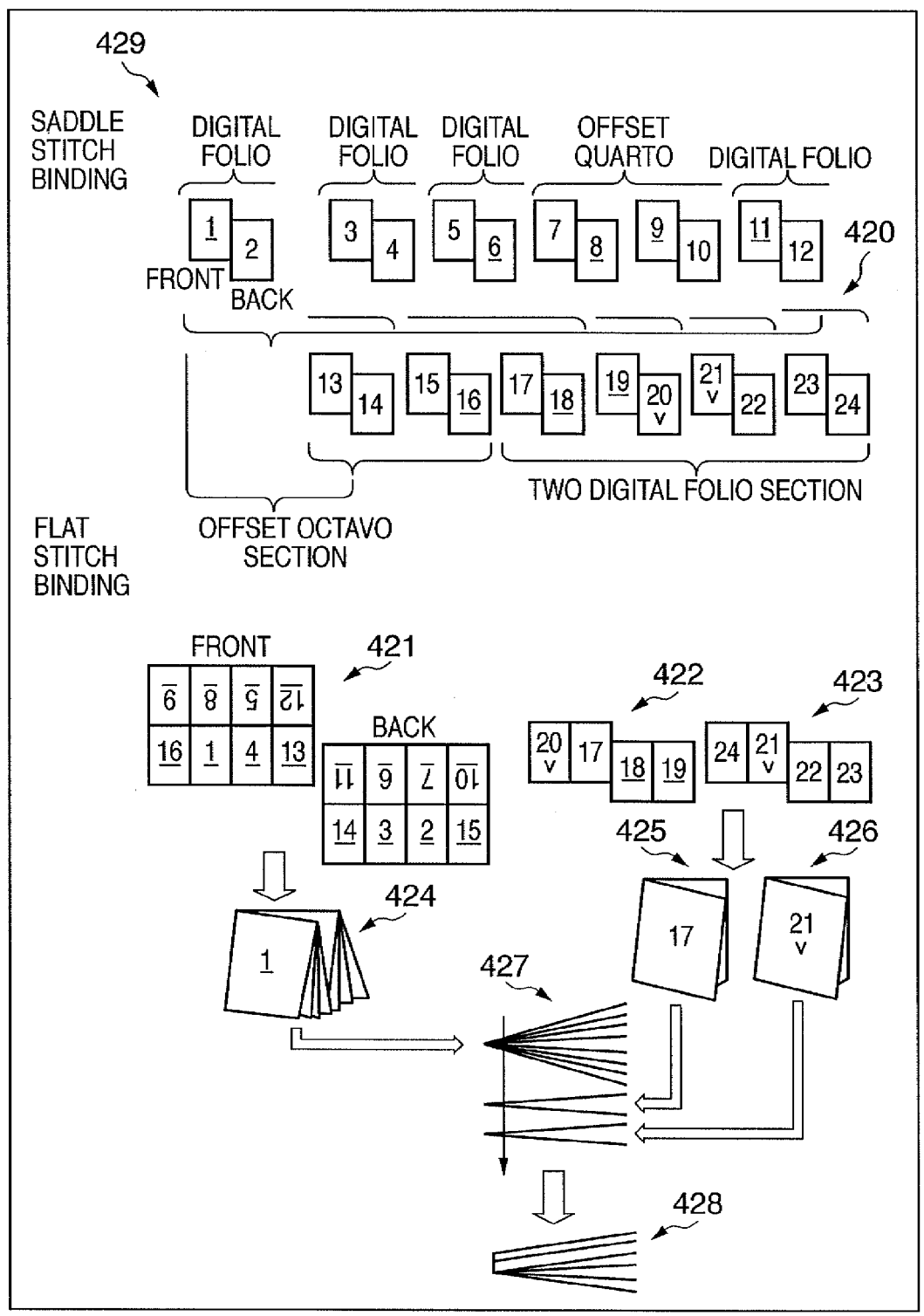
FIG. 4 is a view showing still another example of page segmentation according to the embodiments.

Another example of page segmentation by the page segmenting unit 104 in FIG. 1A will be explained. FIG. 4 is a view showing another example of page segmentation.

In FIG. 4, reference numeral 420 denotes page data before segmentation. FIG. 4 shows page data of 24 pages which assume double-sided printing. Page numbers and variable print page marks in FIG. 4 have the same meanings as those in FIGS. 2 and 3 described above. In FIG. 4, variable printing is done at the 20th and 21st pages.

In FIG. 4, the page data 420 undergoes flat stitch binding in accordance with determination in the embodiments.

The page data 420 is segmented into three page groups which are imposed an imposition 421 for the plate offset printing, and impositions 422 and 423 for the plateless digital printing. The 1st to 16th pages are combined into the imposition 421 for the plate offset printing, and a sheet of these 16 pages is folded into octavo. The 17th to 20th pages are combined into the imposition 422 for the plateless digital printing, and a sheet of these 4 pages are folded into folio. The 21st to 24th pages are combined into the imposition 423 for the plateless digital printing, and a sheet of these 4 pages are folded into folio.

Reference numerals 424, 425, and 426 denote sections each upon printing and folding these pages. Reference numeral 427 denotes a state in which the sections 424 to 426 are superposed for flat stitch binding. Reference numeral 428 denotes a resultant bound product. Flat stitch binding is executed after at least one edge (e.g., top edge) of the section 424 is cut.

Reference numeral 429 denotes a comparative example of performing saddle stitch binding for the page data 420 in FIG. 4. In saddle stitch binding in FIG. 4, pages 1, 2, 23 and 24 are subjected to digital printing on a sheet and folio processing, pages 3, 4, 21 and 22 are subjected to digital printing on a sheet and folio processing, and pages 5, 6, 19 and 20 are subjected to digital printing on a sheet and folio processing. Pages 7 to 10 and 15 to 18 are subjected to offset printing on a sheet and quarto processing, and pages 11 to 14 are subjected to digital printing on a sheet and folio processing.

(Page Segmentation Example 4)

Figure 5:
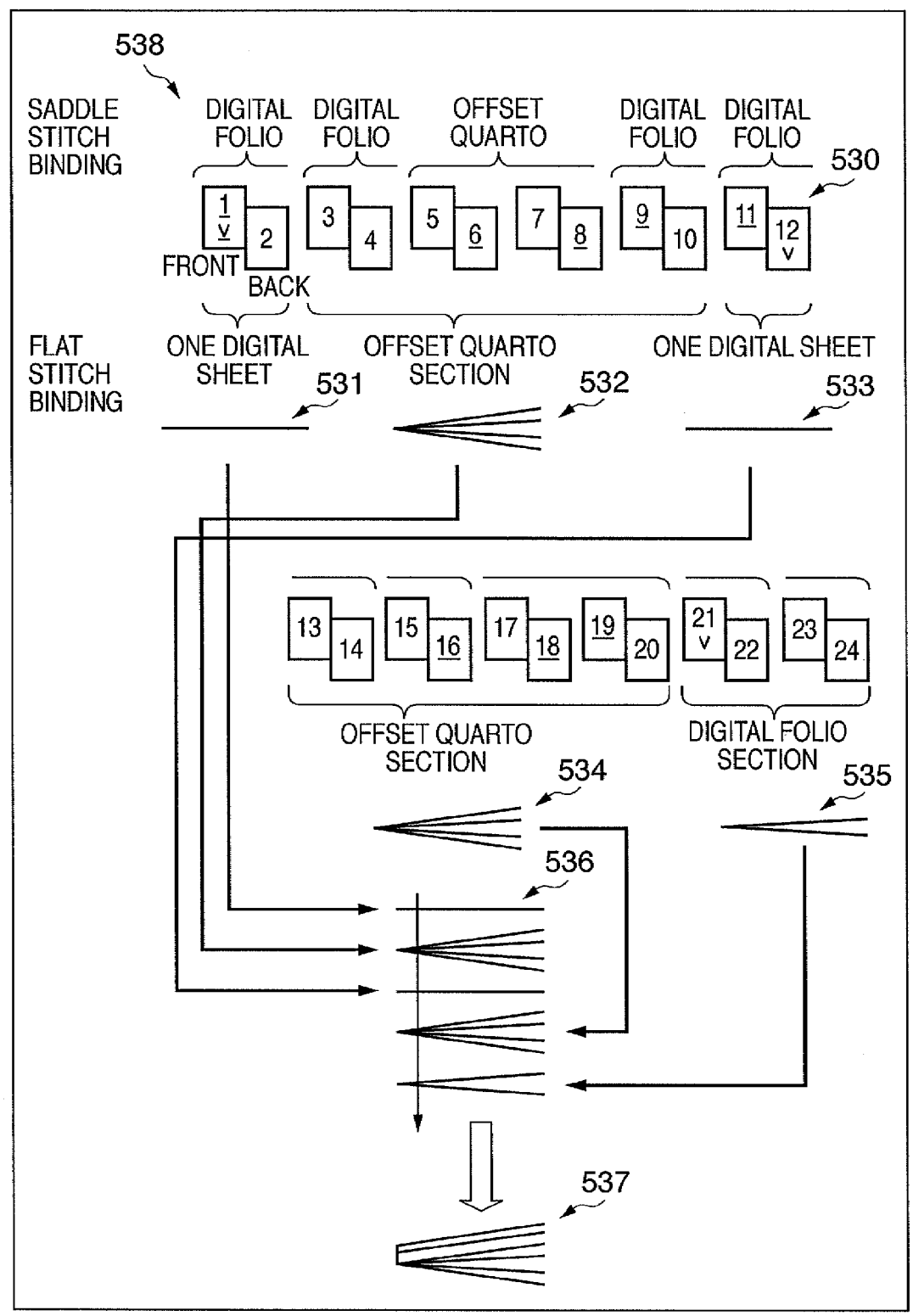
FIG. 5 is a view showing still another example of page segmentation according to the embodiments.

FIG. 5 shows another example of page segmentation of page data of 24 pages. In FIG. 5, variable printing is done at the 1st, 12th and 21st pages.

In the example shown in FIG. 5, the page data is segmented into five page groups, including one sheet 531 for plateless digital printing without any section, a section 532 for the plate offset printing, one sheet 533 for plateless digital printing, a section 534 for the plate offset printing, and a section 535 for the plateless digital printing. As represented by reference numeral 536, the sheet 531, section 532, sheet 533, and sections 534 and 535 are sequentially superposed for flat stitch binding to produce a bound product 537.

Reference numeral 538 denotes a comparative example of performing saddle stitch binding for the page data 530 in FIG. 5. In saddle stitch binding in FIG. 5, pages 1, 2, 23 and 24 are subjected to digital printing on a sheet and folio processing, pages 3, 4, 21 and 22 are subjected to digital printing on a sheet and folio processing, and pages 5 to 8 and 17 to 20 are subjected to offset printing on a sheet and quarto processing. Pages 9, 10, 15 and 16 are subjected to digital printing on a sheet and folio processing, and pages 11 to 14 are subjected to digital printing on a sheet and folio processing.

As is apparent from the page segmentation examples shown in FIGS. 2, 3, 4, and 5, pages are segmented to page groups for the plate offset printing and those for the plateless digital printing by combining binding methods, fold counts, and paper sizes corresponding to the fold counts.

<Example of Overall Processing Sequence by Printing and Binding System According to Embodiments>

A processing sequence in the embodiments will be described in detail.

Figure 6:
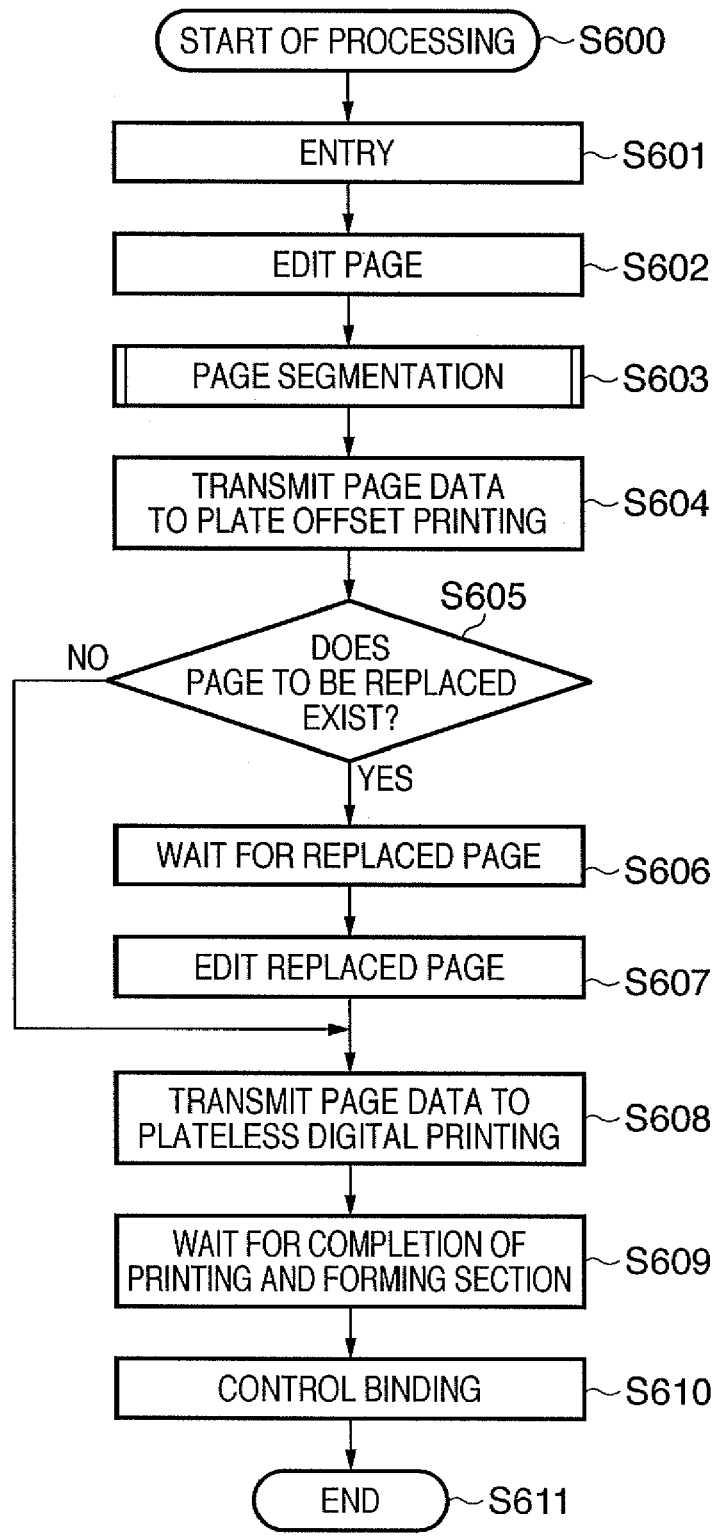
FIG. 6 is a flowchart showing an overall sequence by the printing and binding system according to the embodiments.

FIG. 6 is a flowchart showing the overall processing sequence by the printing and binding system shown in FIG. 1A according to the embodiments. In centralized control, the job control unit 106 in FIG. 1A executes this flowchart.

In step S600, the process starts. In step S601, page data is input via the document reception unit 107. At this time, if variable print data exists, it may be provided from the database 108. In step S602, pages are edited. At this time, variable data is allocated, and a not-received page is designated to generate reference information for the next page segmentation.

In step S603, pages are segmented into page groups for plate offset printing and page groups for plateless digital printing. This page segmentation will be explained in accordance with more detailed flowcharts in FIGS. 7-9.

In step S604, the page groups segmented for plate offset printing are transmitted to the pre-press 109.

As for the page groups for plateless digital printing, it is determined in step S605 whether replaced page(s) to be replaced exists. If a replaced page to be replaced exists (YES in S605), the process advances to step S606. If no replaced page to be replaced exists (NO in S605), the process advances to step S608. In step S606, the process waits for reception of replacing page. If all replacing pages are prepared, the process advances to step S607. In step S607, page data for plateless digital printing are edited by replacing them with additionally prepared page data. Then, the process advances to step S608.

In step S608, the page groups for plateless digital printing are transmitted to the printer driver 113.

In step S609, the process waits for the completion of printing respective page groups transmitted in steps S604 and S608, and forming sections of printed page groups. Finally in step S610, the job control unit 106 transmits a binding instruction file (JDF: Job Definition Format) to the binding apparatus 116. The binding apparatus 116 sequentially binds the segmented page groups into one book. In step S611, the process ends.

<Example of Page Segmentation Processing Sequence by Page Segmenting Unit>

Figure 7:
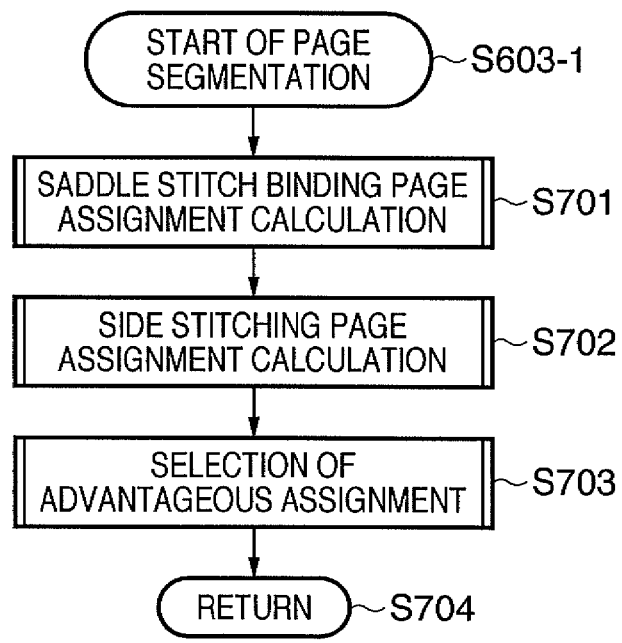
FIG. 7 is a flowchart showing a sequence according to the first embodiment in page segmentation process S603 of FIG. 6.

FIG. 7 is a flowchart showing a detailed processing sequence in page segmentation processing S603 in FIG. 6. In step S603-1, page segmentation processing starts.

In step S701, page assignment calculation is executed on the condition that saddle stitch binding is selected. In step S702, page assignment calculation is executed on the condition that flat stitch binding is selected. In step S703, respective costs and/or times required for calculation results under the saddle stitch binding and flat stitch binding, and other conditions are compared to select a page assignment result exhibiting an advantageous condition(s). Based on the contents of the selection result, pages are segmented into page groups for plate offset printing and plateless digital printing to be executed by the printing and binding system. In step S704, the page segmentation processing ends. The process returns to step S604 in FIG. 6.

The detailed processing sequence of each step in page assignment processing S603 will be explained.

(Saddle Stitch Binding Page Assignment Calculation: S701)

Figure 8:
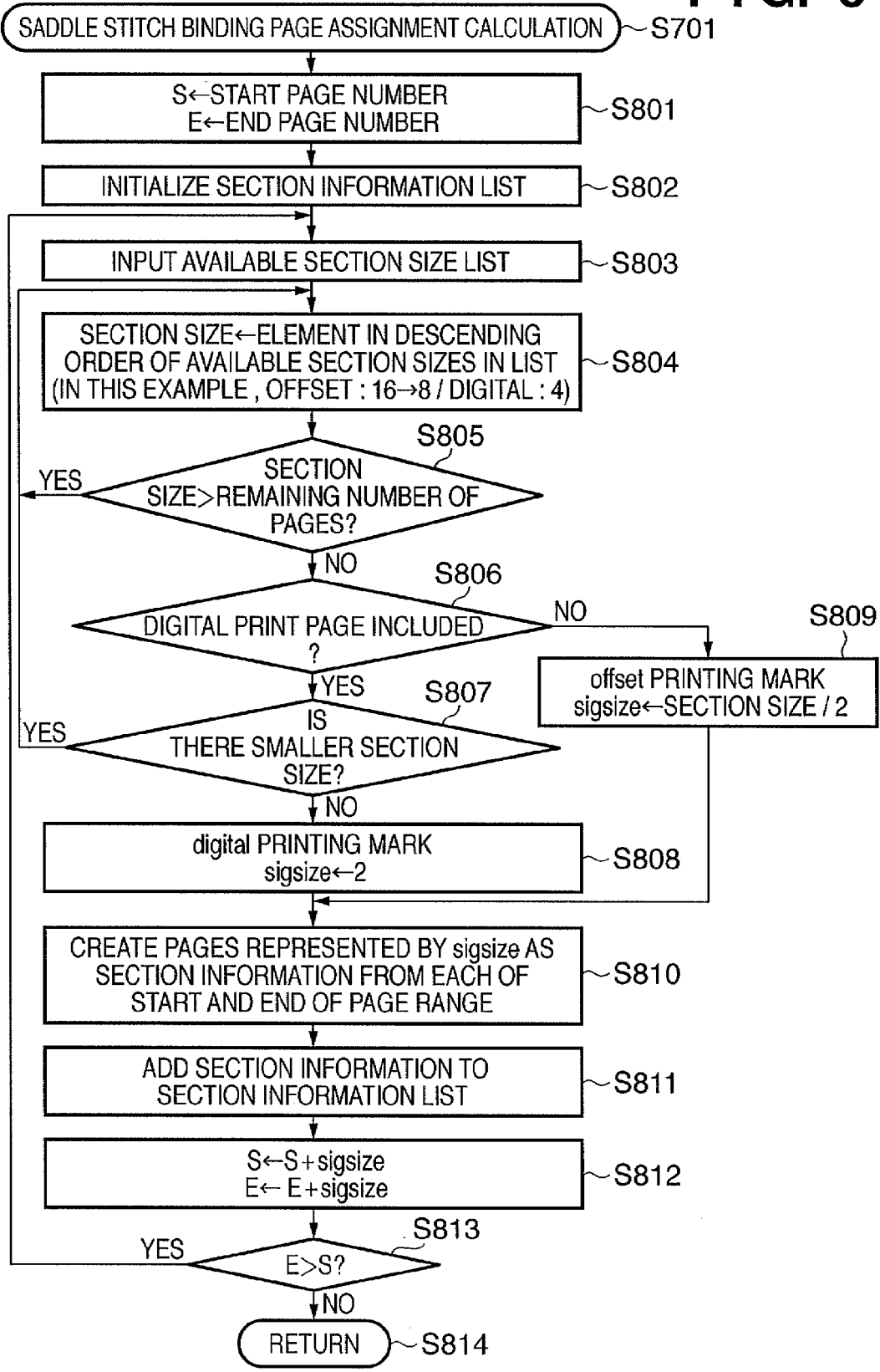
FIG. 8 is a flowchart showing a sequence in saddle stitch binding page assignment calculation S701 of FIG. 7.

FIG. 8 is a flowchart showing a detailed processing sequence in saddle stitch binding page assignment calculation S701 of FIG. 7. In step S701, saddle stitch binding page assignment calculation starts.

In step S801, as one initialization process, the start page number (first page in general) of assigned pages is set in a variable S, and the end page number is set in a variable E. In step S802, as another initialization process, a section information list is initialized. The section information list is a list of pieces of section information each of which holds page numbers corresponding to each section. Each section information holds corresponding page numbers, and a flag representing whether the section is assigned to plate offset printing or plateless digital printing. The section information structure is illustrated in FIG. 10 and the like and will be described later.

In step S803, a list of section sizes available in plate offset printing is acquired from the MIS 120 via the information gathering unit 105. An available section size is determined from an imposition method supported by the pre-press 109, a paper size supported by the plate offset printing device 114, and a fold count supported by the plate offset printing device 114.

Assume that document page data has the A4 size, the paper size supported by the plate offset printing device 114 is the A1 size, the pre-press 109 supports 4-up imposition and 8-up imposition, and fold counts in folding processing are 2 and 3. As a result, available section sizes are two, one size of double-sided 8 pages and another size of double-sided 16 pages. For example, these page counts correspond to counts of continuously printable fixed pages.

In step S804, a section size is acquired in the descending order of page counts from the available section size list acquired in step S803. If section sizes are 16 pages and 8 pages, the value "16 pages" is set as the current section size. In step S805, the current section size is compared with the remaining number of pages, that is, (E−S+1) which can be determined from the variables S and E. If the section size is larger than the remaining number of pages (YES in S805), the process returns to step S804, and the second smaller section size in the available section size list is set as the current section size. If the section size is equal to or smaller than the remaining number of pages (NO in S805), that is, the section size does not exceed the remaining number of pages, the process returns to step S806. In step S806, it is determined whether or not pages subjected to plateless digital printing fall within a range of half of the current section size from each of the start and end of the remaining pages respectively defined by the variables S and E. If no page subjected to plateless digital printing falls within the range (NO in S806), the process advances to step S809. If pages subjected to plateless digital printing fall within the range (YES in S806), the process advances to step S807. In step S807, it is determined whether there is a section size smaller (that is, the number of pages is smaller) than the current section size in the available section size list. If there is a smaller section size (YES in step S807), the process returns to step S804. If there is no smaller section size (NO in step S807), the process advances to step S808.

In step S808, "2" is set in a temporary variable "sigsize" for the next processing. The temporary variable sigsize determines the number of pages of section information to be created next. The variable sigsize "2" means that two pages are extracted as section information from each of the start and end of the remaining pages respectively defined by the variables S and E. In step S808, it is set that section information to be formed is marked for plateless digital printing. In step S809, the value of half of the current section size is set in the temporary variable sigsize. For example, if the current section size is 16 pages, "8" is set. Then, it is set that section information to be formed next is marked for plate offset printing. After the end of steps S808 and S809, the process advances to step S810.

In step S810, pages represented by sigsize are extracted as section information from each of the start and end of the remaining pages respectively defined by the variables S and E. In step S811, the section information is added to the section information list.

In step S812, the variables S and E are updated to exclude the pages now added to the section information from the remaining pages respectively defined by the variables S and E. In step S813, it is determined whether section information has been created for the entire page range. If the end page number is larger than the start page number (YES in S813), this means that there is remained pages which need to be assigned, and the process returns to step S803. If the end page number is equal to or smaller than the start page number (NO in S813), the process advances to step S814 to end the saddle stitch binding page assignment calculation, and returns to S702 in FIG. 7.

(Flat Stitch Binding Page Assignment Calculation: S702)

Figure 9A:
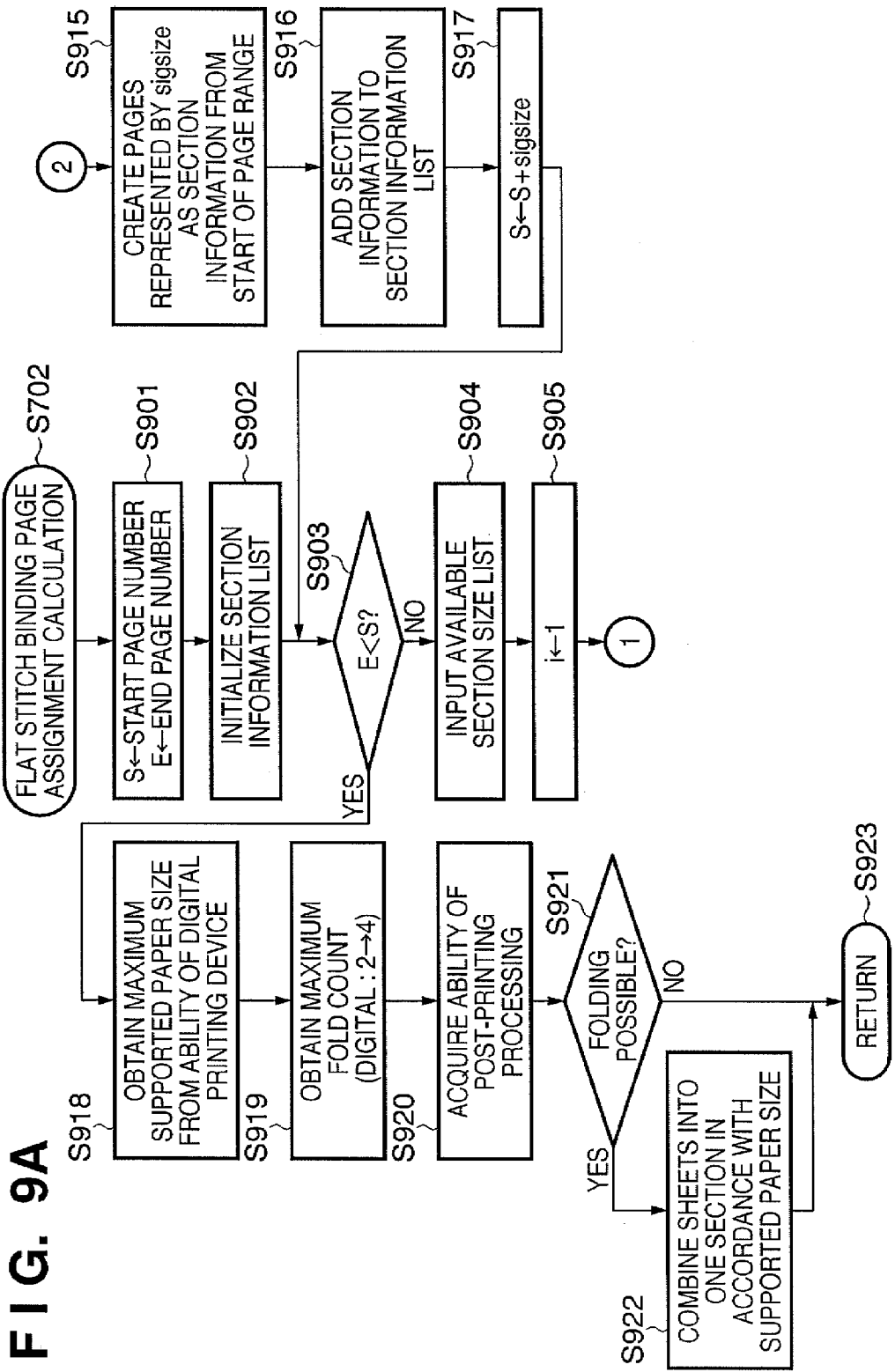
FIGS. 9A and 9B are a flowchart showing a sequence in flat stitch binding page assignment calculation S702 of FIG. 7.
Figure 9B:
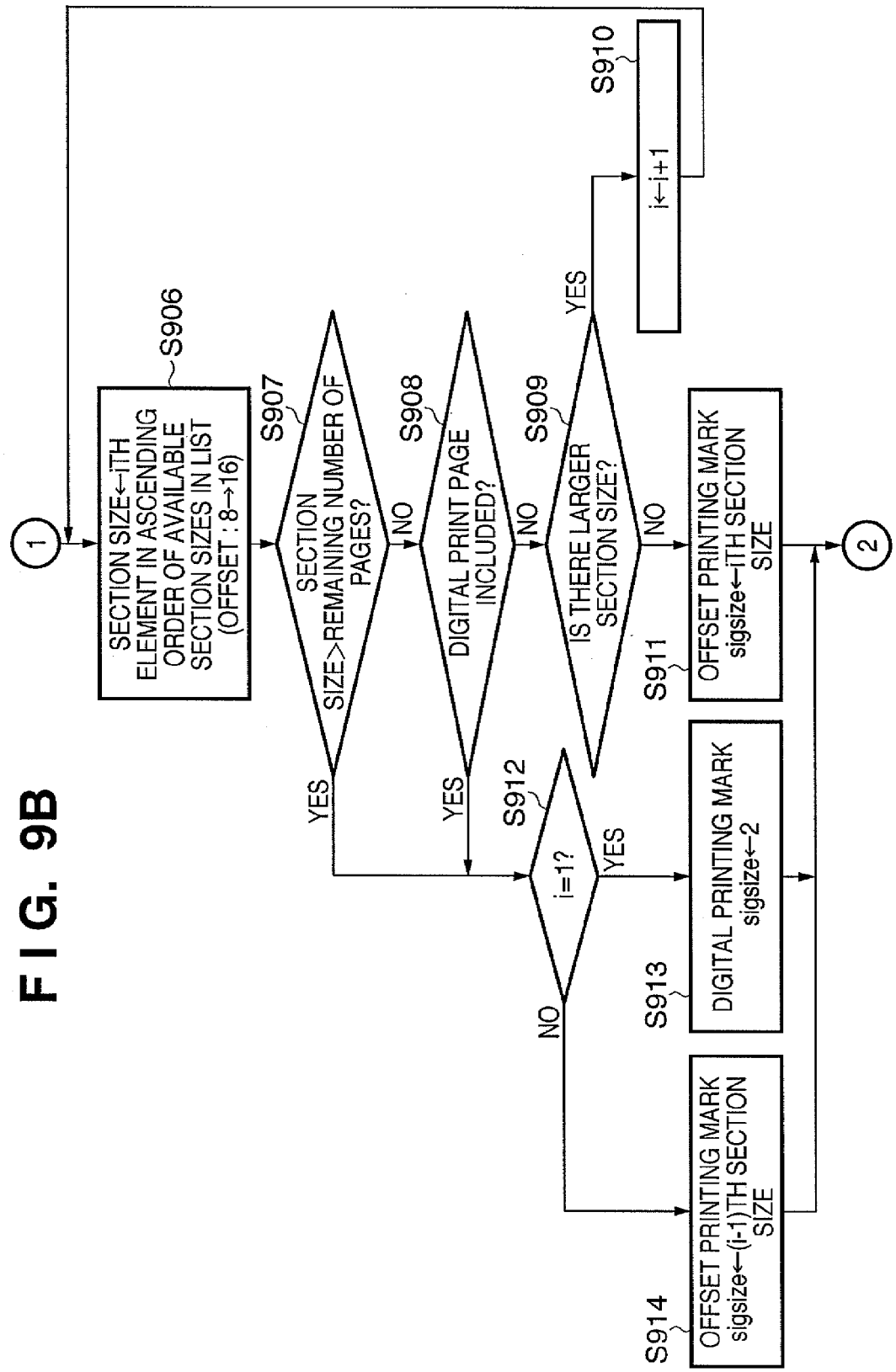

FIGS. 9A and 9B are a flowchart showing a detailed processing sequence in flat stitch binding page assignment calculation S702 of FIG. 7. In step S702, flat stitch binding page assignment calculation starts.

In step S901, the start page variable S and end page variable E are initialized, similar to S801 in FIG. 8. In step S902, the section information list is initialized. In step S903, it is determined whether section information has been created for the entire range of pages. If the start page variable S is larger than the end page variable E (YES in S903), this means that all pages have been assigned, and the process advances to step S918. If the start page variable S is equal to or smaller than the end page variable E (NO in S903), the process advances to step S904.

In step S904, an available section size list is acquired, similar to step S803 in FIG. 8. In step S905, a temporary variable i for actual processing is initialized to 1. The temporary variable i is used as the index of the available section size list.

In step S906, the ith section size counted in the ascending order of section sizes in the available section size list is set as the current section size. In step S907, the current section size is compared with the remaining number of pages. If the current section size is larger than the remaining number of pages (YES in S907), the process advances to step S912. If the current section size is equal to or smaller than the remaining number of pages (NO in S907), the process advances to step S908.

In step S908, it is determined from the variable S whether a page subjected to plateless digital printing exists in pages of the current section size. If a page subjected to plateless digital printing exists (YES in S908), the process advances to step S912. If no page subjected to plateless digital printing exists (NO in S908), the process advances to step S909. In step S909, it is determined whether there is a section size larger (the number of pages is larger) than the current section size in the available section size list. If there is a larger section size (YES in step S909), the process advances to step S910. If there is no larger section size (NO in step S909), the process advances to step S911.

In step S910, the temporary variable i is incremented, and the process returns to step S906 in order to acquire the next section size. In step S911, the ith section size counted in the ascending order of section sizes in the available section size list is set in the temporary variable sigsize. It is set that section information to be formed is marked for plate offset printing.

In step S912, it is determined whether the variable i is 1. This means that the section for plate offset printing cannot be assigned even at the smallest section size in the available section size list. If the variable i is 1 (YES in S912), the process advances to step S913. If the variable i is not 1 (NO in S912), the process advances to step S914.

In step S913, "2" is set in the temporary variable sigsize. Then, it is set that section information to be formed is marked for plateless digital printing. In step S914, the (i−1)th section size counted in the ascending order of section sizes in the available section size list, that is, a section size having the largest number of pages assigns without including any page for plateless digital printing is set in the temporary variable sigsize. It is set that section information to be formed is marked for plate offset printing.

After the end of steps S911, S913, and S914, the process advances to step S915. In step S915, pages represented by sigsize are extracted as section information from the start of the range of pages defined by the variable S. In step S916, the section information is added to the section information list. In step S917, the variable S is updated to exclude the pages added to the section information from the range of pages defined by the variables S and E. After that, the process returns to step S903.

If the start page variable S is equal to or smaller than the end page variable E (NO in S903), the process advances to step S918. In step S918, the generated section information list is adjusted to be optimized for plateless digital printing.

In step S918, a maximum supported paper size available in plateless digital printing is acquired from the MIS 120 via the information gathering unit 105. In step S919, the fold count is obtained from the maximum supported paper size and page size. For example, when the supported paper size is A3 and the page size is A4, the fold count is one. In step S920, the post-processing ability after plateless digital printing is acquired. In step S921, it is determined whether folding at the fold count obtained in step S919 is possible by the device ability acquired in step S920. If folding is possible (YES in S921), the process advances to step S922. If folding is impossible (NO in S921), the process advances to step S923.

In step S922, pieces of section information assigned to plateless digital printing are integrated in accordance with the fold count obtained in step S919. For example, when the possible fold count is one, two successive pieces of section information for plateless digital printing are integrated into one section. When the possible fold count is two, four successive pieces of section information for plateless digital printing are integrated into one section. Letting f be the fold count, $2^f$ successive pieces of section information for plateless digital printing are integrated into one section in the above-described way. The flat stitch binding page layout calculation ends in step S923, and the process returns to S703 of FIG. 7.

<Concrete Examples of Page Assignment by Page Segmenting Unit>

Concrete examples of page assignment calculation for saddle stitch binding and flat stitch binding will be described. These concrete examples are based on page data of 24 pages shown in FIGS. 4 and 5.

(Example Saddle Stitch Binding Page Assignment of Page Data in FIG. 4)

FIG. 10 shows an example of a section information list 1000 as a result of assigning the page data 420 in FIG. 4 in accordance with the saddle stitch binding assignment processing of the flowchart shown in FIG. 8.

In FIG. 10, the upper five lines represent a section information list, and each line in the section information list represents section information. The term "digital" or "offset" on the left side of each line respectively represents that section information on the line is a section for plateless digital printing or a section for plate offset printing. Each numerical value in the list represents a page number. "#" represents a position at which the saddle stitch binding imposition is divided into right and left parts. The letter "d" described on the right side of a page number represents the position of a page for plateless digital printing by variable printing.

In FIG. 10, the lowest line represents the number of pages and the number of sections respectively assigned to plate offset printing and plateless digital printing. In FIG. 10, eight pages and one section are assigned to plate offset printing, and 16 pages and four sections are assigned to plateless digital printing.

In the example shown in FIG. 10, double-sided 8 pages and double-sided 16 pages are available as section sizes in plate offset printing.

(Example of Flat Stitch Binding Page Layout of Page Data in FIG. 4)

FIG. 11 shows an example of a section information list 1100 as a result of assigning the page data 420 in FIG. 4 in accordance with the flat stitch binding assignment processing of the flowchart shown in FIG. 9 under the same conditions as those in FIG. 11. Numerical values and signs in FIG. 11 have the same meanings as those in FIG. 10.

In FIG. 11, the upper five lines represent a section information list. FIG. 12 shows an example of a section information list 1200 as a result of advancing the process from the state of FIG. 11 up to step S923 after step S918.

In the example shown in FIG. 12, calculation is done on condition that a paper size and post-processing for a fold count of 1 are available in plateless digital printing. As is apparent from FIGS. 11 and 12, since one folding is possible, four sections for plateless digital printing are integrated into two sections. The resultant sections in FIG. 12 correspond to the sections 424, 425 and 426 in FIG. 4.

(Example of Saddle Stitch Binding Page Assignment of Page Data in FIG. 5)

FIG. 13 shows an example of a section information list 1300 as a result of assigning the page data 530 in FIG. 5 in accordance with the saddle stitch binding assignment processing of the flowchart shown in FIG. 8. The conditions of available section sizes are the same as those in FIG. 10.

In FIG. 13, the upper five lines represent a section information list, and each line in the section information list represents section information. In FIG. 13, eight pages and one section are assigned to plate offset printing, and 16 pages and four sections are assigned to plateless digital printing.

(Example of Flat Stitch Binding Page Assignment of Page Data in FIG. 5)

FIG. 14 shows an example of a section information list 1400 as a result of assigning the page data 530 in FIG. 5 in accordance with the flat stitch binding assignment processing of the flowchart shown in FIG. 9 under the same conditions as those in FIG. 13. Numerical values and signs in FIG. 14 have the same meanings as those in FIG. 13.

FIG. 15 shows an example of a section information list 1500 as a result of advancing the process from the state of FIG. 14 up to step S923 after step S918. As is apparent from FIGS. 14 and 15, since one folding is possible, the last two sections for plateless digital printing are integrated into one section. The resultant sections in FIG. 15 correspond to the sections 531, 532, 533, 534 and 535 in FIG. 5.

The job control unit 106 in FIG. 1A segments page data in accordance with the section information lists shown in FIGS. 10, 12, 13 and 15, and transmits them to the pre-press 109 and printer driver 113.

<Example of Assignment Selection Processing Sequence According to Embodiments>

A sequence to select a page assignment result exhibiting an advantageous condition in S703 of FIG. 7 will be explained.

(Advantageous Assignment Selection Example 1: S703)

Figure 16:
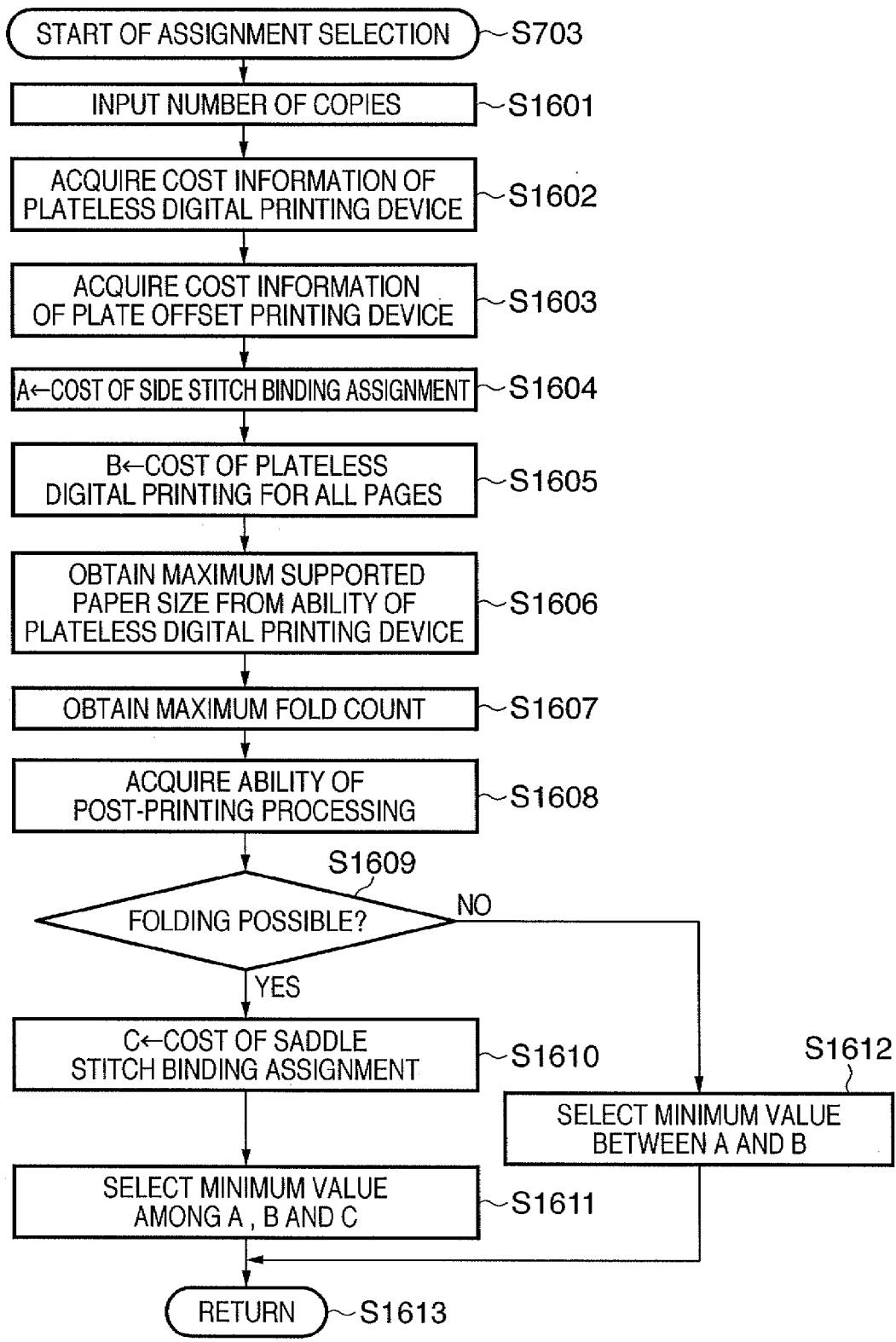
FIG. 16 is a flowchart showing a sequence in assignment selection processing S703 of FIG. 7.

FIG. 16 is a flowchart showing a detailed processing sequence in advantageous assignment selection processing S703 of FIG. 7. In step S703, processing to select an advantageous page assignment method, that is, page segmentation method starts. In this example, an advantageous method means a page assignment method which satisfies predetermined conditions under which the cost reduces depending on the following determination criterion. A page assignment method which shortens the processing time, or a page assignment method based on the trade-off between the cost and the processing time can also be selected. These selection processes are also incorporated in the present invention.

In step S1601, the number of output copies is input. The number of copies is obtained from the document reception unit 107 in entry or determined by an operator. In step S1602, cost information when the plateless digital printing device 115 prints is acquired from the MIS 120 via the information gathering unit 105. In step S1603, cost information when the plate offset printing device 114 prints is acquired.

In step S1604, the cost of the flat stitch binding assignment is calculated and set in an internal variable "A." In step S1605, the cost when the plateless digital printing device 115 prints all pages is calculated and set in an internal variable "B."

In step S1606, a maximum supported paper size available in plateless digital printing is acquired from the MIS 120 via the information gathering unit 105. In step S1607, the fold count is obtained from the maximum supported paper size and page size. For example, when the supported paper size is A3 and the page size is A4, the fold count is one.

In step S1608, the post-processing ability after plateless digital printing is acquired. In step S1609, it is determined whether folding at the fold count obtained in step S1607 is possible by the device ability acquired in step S1608. In saddle stitch binding, even plateless digital printing requires imposition of four or more pages on two sides, and one or more folding is necessary. Hence, if folding is impossible after plateless digital printing, page segmentation which assumes saddle stitch binding cannot be selected. If folding is possible (YES in S1608), the process advances to step S1610. If folding is impossible (NO in S1608), the process advances to step S1612. In step S1610, the cost of the saddle stitch binding assignment is calculated and set in an internal variable "C."

In step S1611, the minimum cost among the internal variables A, B and C is selected, and a assignment method corresponding to the minimum cost is selected. In step S1612, the minimum cost between the internal variables A and B is selected, and a assignment method corresponding to the minimum cost is selected.

(Example of Cost Calculation)

An example of cost calculation in steps S1604, S1605 and S1610 will be described in detail.

Figure 17:
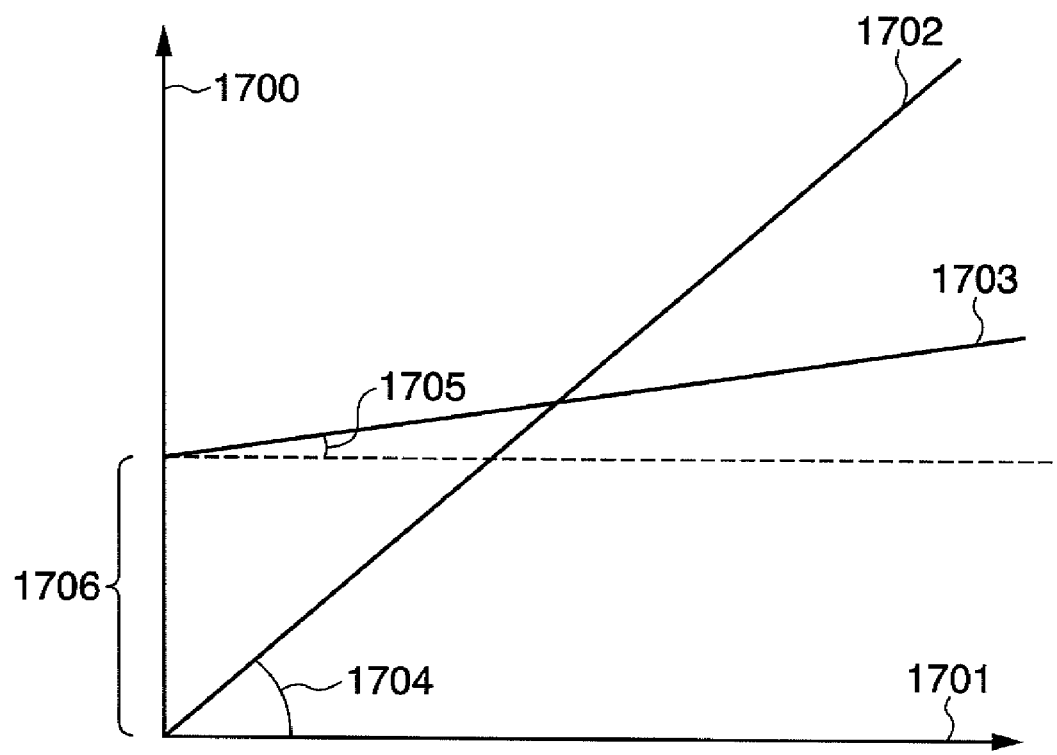
FIG. 17 is a graph showing the relationship between pieces of information held in the MIS.

FIG. 17 is a graph schematically showing the type and meaning of cost information held in the MIS 120 according to the embodiments.

In FIG. 17, an ordinate axis 1700 represents the printing and binding cost. An abscissa axis 1701 represents the number of copies or records. Reference numeral 1702 denotes an exemplary cost graph for plateless digital printing, and reference numeral 1703 denotes an exemplary cost graph for plate offset printing under the same conditions. Reference numeral 1704 denotes a cost coefficient in page unit for plateless digital printing which is one cost information held in the MIS 120 and corresponds to the cost graph 1702. Reference numeral 1705 denotes a cost coefficient in page unit for plate offset printing corresponding to the cost graph 1703. Reference numeral 1706 denotes an initial cost (including a cost of making a press plate) for each section in plate offset printing which is also one cost information held in the MIS 120 and relates to the cost graph 1703.

As shown in FIG. 17, the fixed initial cost 1706 for making a press plate (copper plate) is high in plate offset printing. However, as the number of copies increases, the rate of rise in cost (cost coefficient 1705 in page unit) becomes low. To the contrary, in plateless digital printing, the cost for making a plate is unnecessary or the initial cost is excessively lower than that in plate offset printing. However, as the number of copies (the number of print sheets) increases, the rate of rise in cost (cost coefficient 1704 in page unit) becomes higher than that in plate offset printing.

The embodiments assume variable data printing, so the number of copies equals the number of records to be printed. The record corresponds to the number of variable data for one data item managed in the database. To print variable data of 100 persons, 100 records must be printed.

The cost when the plateless digital printing device prints can be calculated by the following equation (1):

cost of plateless digital printing=the number of sheets in one copy (four pages per sheet for folio)×the number of records to be printed×rate of rise (cost coefficient 1704 in gage unit) (1)

The cost when the plate offset printing device prints can be calculated by the following equation (2):

cost of plate offset printing device=(press plate cost 1706×the number of press plates)+(the number of press plates×the number of records to be printed×rate of rise (cost coefficient 1705 in page unit)) (2)

By applying these equations to each page segmentation pattern, the job control unit 106 calculates the total cost, and determines a page segmentation pattern exhibiting the lowest cost.

In the above-described cost calculation, the total cost is calculated by applying the total number of pages to the graph, based on information on the number of pages by each printing method after page segmentation, the number of sections, and the number of copies illustrated in FIGS. 10 to 15, and the initial cost and coefficients illustrated in FIG. 17.

The MIS 120 calculates and holds the coefficients and initial cost shown in FIG. 17 from the operation record of each printing device.

A page assignment method exhibiting an advantageous condition is determined based on the calculation as described with reference to FIGS. 16 and 17.

<Example of Page Editing Processing According to Embodiments>

Page editing processing via the user interface of the editing display unit 103 will be explained in detail.

(Display Example of Variable Print Page)

Figure 18:
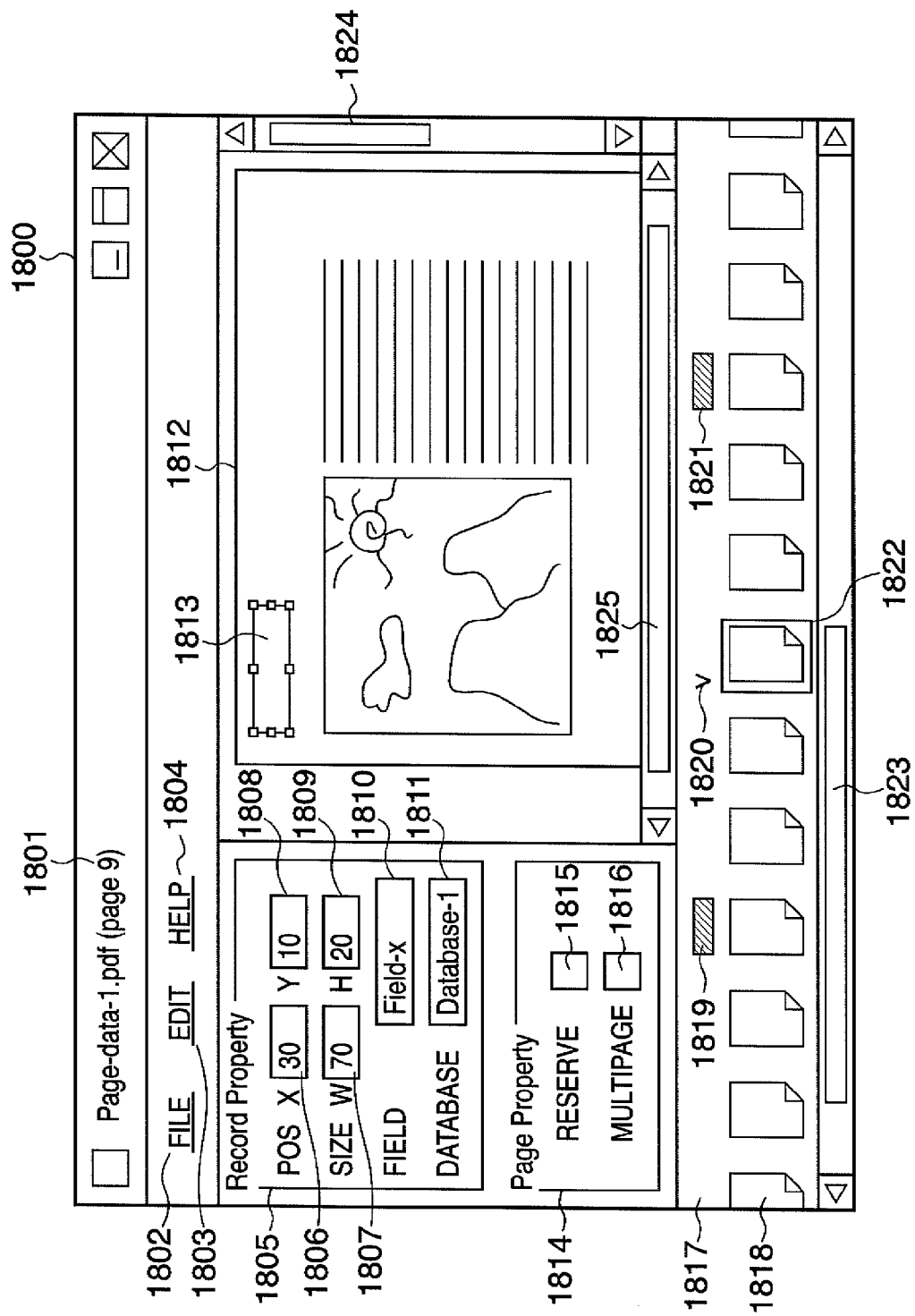
FIG. 18 is a view showing an example of an edit window in which a variable print page is selected according to the embodiments.

FIG. 18 shows an example of an edit window 1800 operable in the editing display unit 103 in FIG. 1A. The user operates the edit window shown in FIG. 18 using an input device such as a keyboard or mouse (corresponding to the display unit 103*a* and input instruction unit 103*b* in FIG. 1B).

In FIG. 18, reference numeral 1800 denotes an edit window. Reference numeral 1801 denotes a page data name (file name) to be edited and a page number during editing. Reference numeral 1802 denotes a menu button which provides a file operation function, 1803 denotes a menu button which provides an edit function, and 1804 denotes a menu button which provides a help function.

The edit window 1800 is made up of roughly four areas: an upper left area 1805 for inputting variable print data settings, a left center area 1814 for inputting page settings, a right area 1812 for displaying and editing each page, and a lower area 1817 for displaying a page list.

The upper left area 1805 includes an X-coordinate 1806, Y-coordinate 1808, width 1807 and height 1809 of a currently selected variable print data field, a field name 1810 of this field, and a database name 1811 corresponding to this field.

The left center area 1814 includes a check box 1815 representing that the document of a currently selected page has not been determined, and a check box 1816 representing the possibility at which an undetermined page may be replaced with a plurality of pages as a result of determining the document.

The right area 1812 where each page is displayed and edited has a longitudinal scroll bar 1824 and lateral scroll bar 1825. The right area 1812 allows the user to confirm details of the entire page. In the right area 1812, reference numeral 1813 denotes a currently selected variable print data field.

In the lower area 1817 where a page list is displayed, a list of pages typified by a page 1818 is displayed. An undetermined page mark 1819 or 1821, or a mark 1820 representing the presence of variable data is sometimes displayed at each page. Reference numeral 1823 denotes a scroll bar in the page list area which allows the user to confirm all pages. Reference numeral 1822 denotes a currently selected page. The right area 1812 displays page contents corresponding to the selected page 1822.

The window shown in FIG. 18 appears when page data is input to the document reception unit 107, and allows editing pages.

The user can lay out a variable print data field by operating the edit menu button 1803 after designating a position in the right area 1812. The variable print data field 1813 is an example of the field laid out in this manner. The user can select a laid-out field and change detailed settings of the field in the upper left area 1805.

In the example of FIG. 18, the position of the variable print data field 1813 is displayed at the X-coordinate 1806 and Y-coordinate 1808, and the field size is displayed at the width 1807 and height 1809. The settings of the field position and size can also be changed in the right area 1812 or by inputs in the upper left area 1805. The database name 1811 represents a database (table) which holds a variable data record corresponding to the variable print data field 1813. The field name 1810 shows a name for specifying a column in the database designated by the database name 1811. In the example of FIG. 18, the name "Field-x" of the table "Database-1" corresponds to the variable print data field 1813 on the page. In printing, data are sequentially read out from the column "Field-x" of the table "Database-1", and laid out in the variable print data field 1813.

If even one variable print data is laid out on a page, like the variable print data field 1813, a mark "V" as represented by the mark 1820 is displayed at a corresponding page in the lower area 1817. The mark "V" represents that the marked page contains variable print data. A page with this mark is processed as a page subjected to plateless digital printing, like the fourth page in FIG. 2 or the 20th or 21st page in FIG. 10.

The user can select a page to be edited by selecting a page in the lower area 1817, and change a page displayed in the right area 1812.

(Display Example When Number of Undetermined Print Pages is One)

Figure 19:
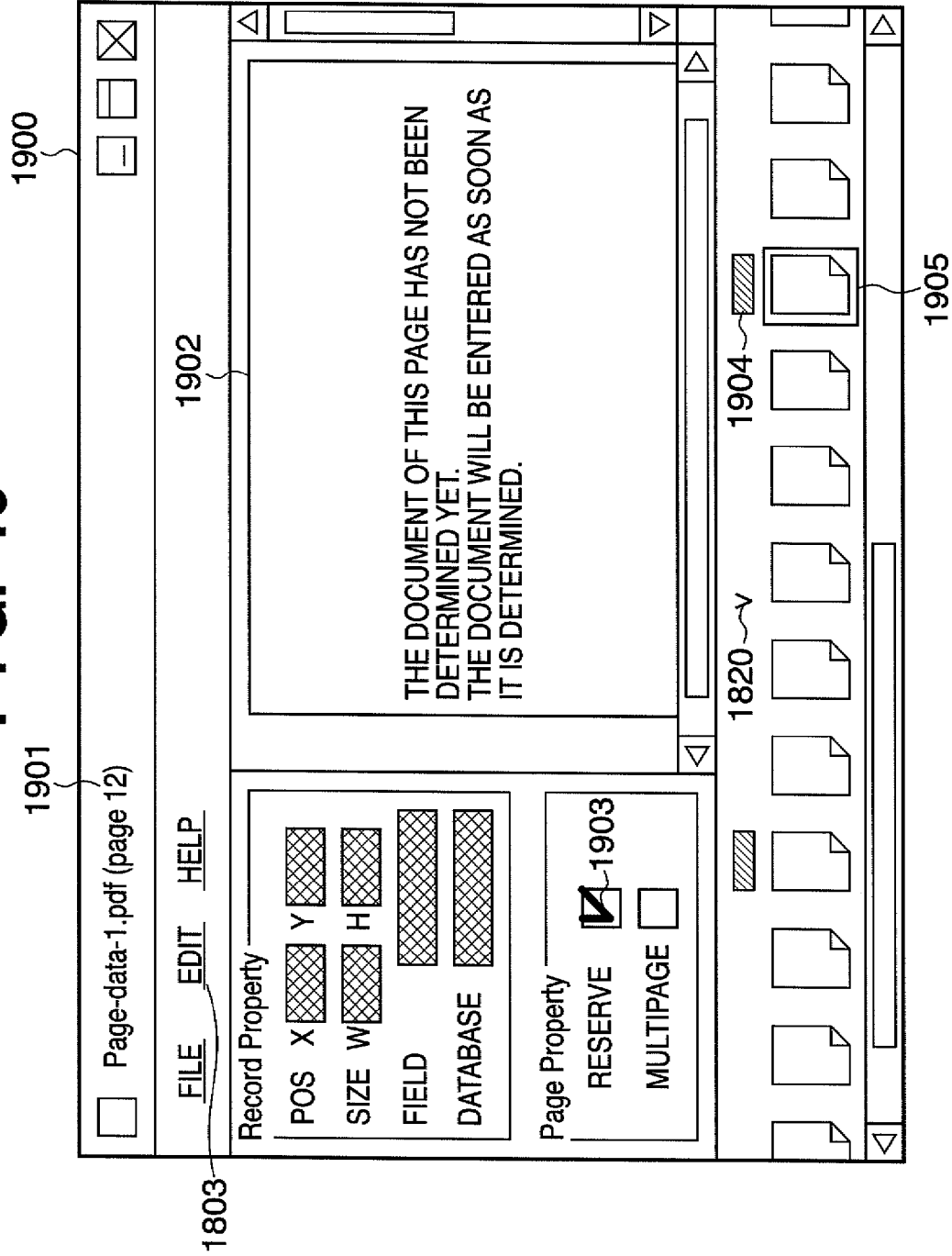
FIG. 19 is a view showing an example of an edit window in which an undetermined print page is selected according to the embodiments.

FIG. 19 shows an example of a window 1900 in which a page different from that in FIG. 18 is selected.

FIG. 19 shows a window when a page 1905 is selected. As represented by a line 1901, the 12th page is selected in the edit window 1900. A right area 1902 displays page contents corresponding to the selected page 1905.

In the example of FIG. 19, received page data contain an undetermined page, and a comment by the user who has input the page data is described at a corresponding page portion in entry. The editor of the page sets the 12th page as an undetermined page by operating a check box 1903 representing that the document of the currently selected page has not been determined. By this operation, a mark such as an undetermined page mark 1904 is displayed to represent that the target page is to be replaced. A page with this mark is processed as a page subjected to plateless digital printing, like a page with the variable print page mark 1820.

In the edit window according to the embodiments, the user can insert, delete, and replace a page by operating the edit menu button 1803. By this operation, a page with a replaced page mark such as the undetermined page mark 1904 is replaced with a determined page. If the position of a replaced page is not explicitly described in page data in entry, like the example shown in FIG. 19, the operator inserts a temporary page in the edit window according to the embodiments, and sets a replaced page mark.

In FIG. 19, one page with the undetermined page mark 1904 is replaced with another page. In this case, the number of pages does not change, and thus does not affect page segmentation processing in step S603 of FIG. 6. However, the page segmentation processing is affected when the number of pages which are to replace an undetermined page is not determined, for example, when it is not determined whether the number of pages to be inserted into an undetermined page is one or two. In this case, it is set that the target page may be replaced with a plurality of pages.

(Display Example when Number of Undetermined Print Pages is Plural)

Figure 20:
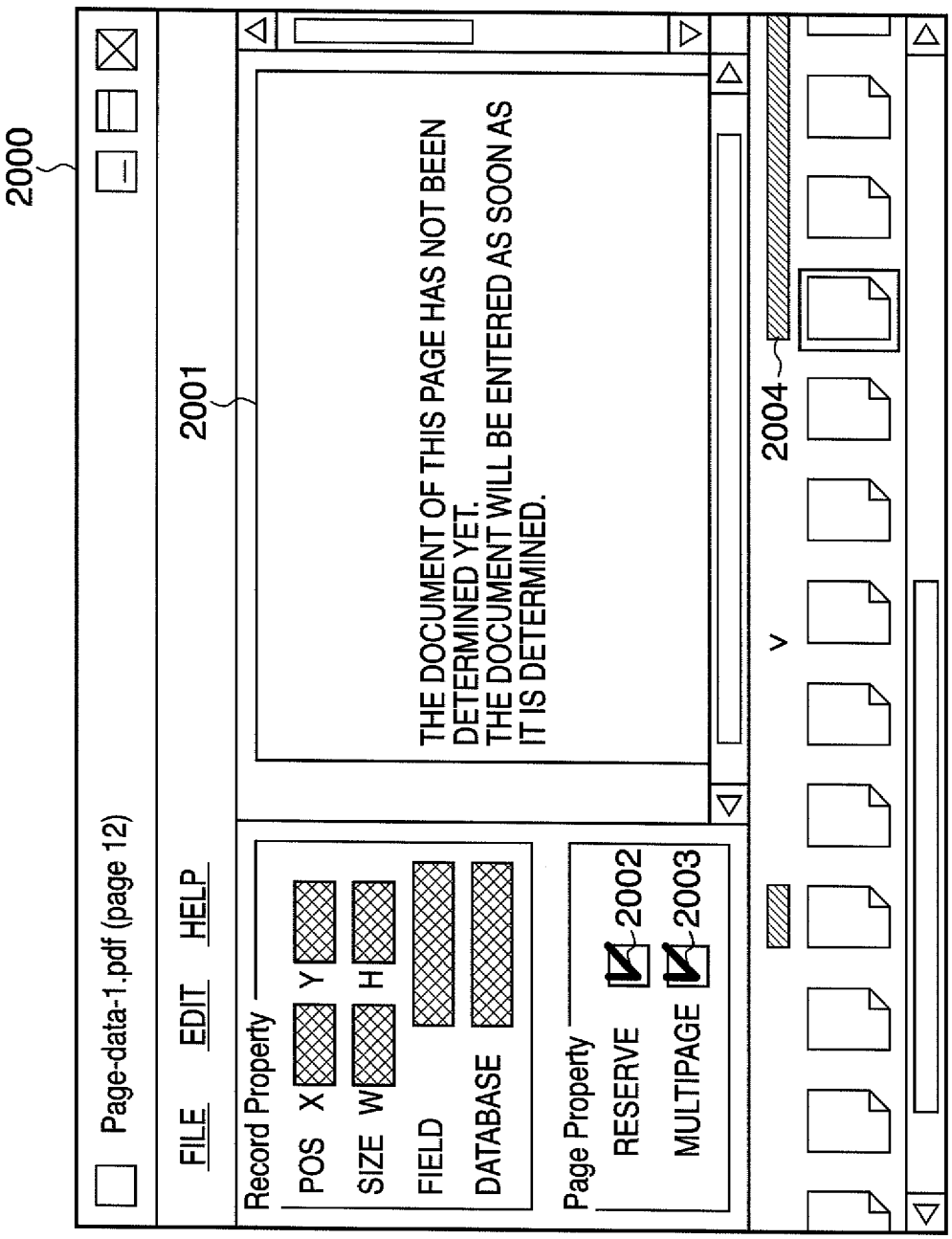
FIG. 20 is a view showing an example of an edit window in which a plurality of undetermined print pages are selected according to the embodiments.

FIG. 20 shows an example of making a setting of replacing the 12th page with a plurality of pages. In FIG. 20, the user sets a check box 2003 representing the possibility at which an undetermined page may be replaced with a plurality of pages as a result of determining the document in FIG. 19. The user sets a check box 2002, and further sets the check box 2003. Then, replaced page marks are set on all pages from the target page to final page, as represented by an undetermined page mark 2004. This can prevent the influence on the page segmentation processing.

Reference information necessary for page segmentation processing is obtained based on information set by the editing operation shown in FIGS. 18, 19, and 20.

Effects of First Embodiment

As described above, the range of pages is automatically segmented based on information on pages which need to be printed by the plateless digital printing device. Then, printing results processed by the plate offset printing device and plateless digital printing device are combined into one book. The user can easily generate mixed jobs using plate offset printing and plateless digital printing.

Generally in large-volume printing, plate offset printing is superior in cost to plateless digital printing. According to the above-described sequences, calculation is so executed to distribute pages as many as possible to plate offset printing. The cost is checked based on information from the MIS 120. Even if the cost advantage is reversed between plateless digital printing and plate offset printing in small-volume printing or the like, appropriate page distribution is selected. This enables generating jobs which can reduce the cost.

In the first embodiment, parameters which formalize the relationship between the number of pages and the cost are held as information saved in the MIS 120. However, the present invention is not limited to this, and the relationship between the number of pages and the printing time can also form the same model. Based on this information, the range of pages is divided according to the above-described arrangement and processing sequences, generating mixed jobs which can shorten the delivery period. Even a case where a relationship other than one between the number of pages and the cost is utilized as information falls within the scope of embodiments according to the present invention, because effects by the same arrangement can be attained.

Second Embodiment

A printing and binding system according to the second embodiment of the present invention will be described. The second embodiment is related to processing including a selective binding (SB) function of inserting different sections at the same collation position.

The second embodiment adopts the same basic arrangement as that in the first embodiment, and only a difference from the first embodiment will be described.

<Example of Selective Binding (SB) Processing According to Second Embodiment>

Selective binding in plate offset printing can be selected when the same data repetitively appears in a variable printing field even on a page containing variable print data. A sequence to perform page segmentation processing without setting such a page as a plateless digital print page will be explained.

Figure 21:
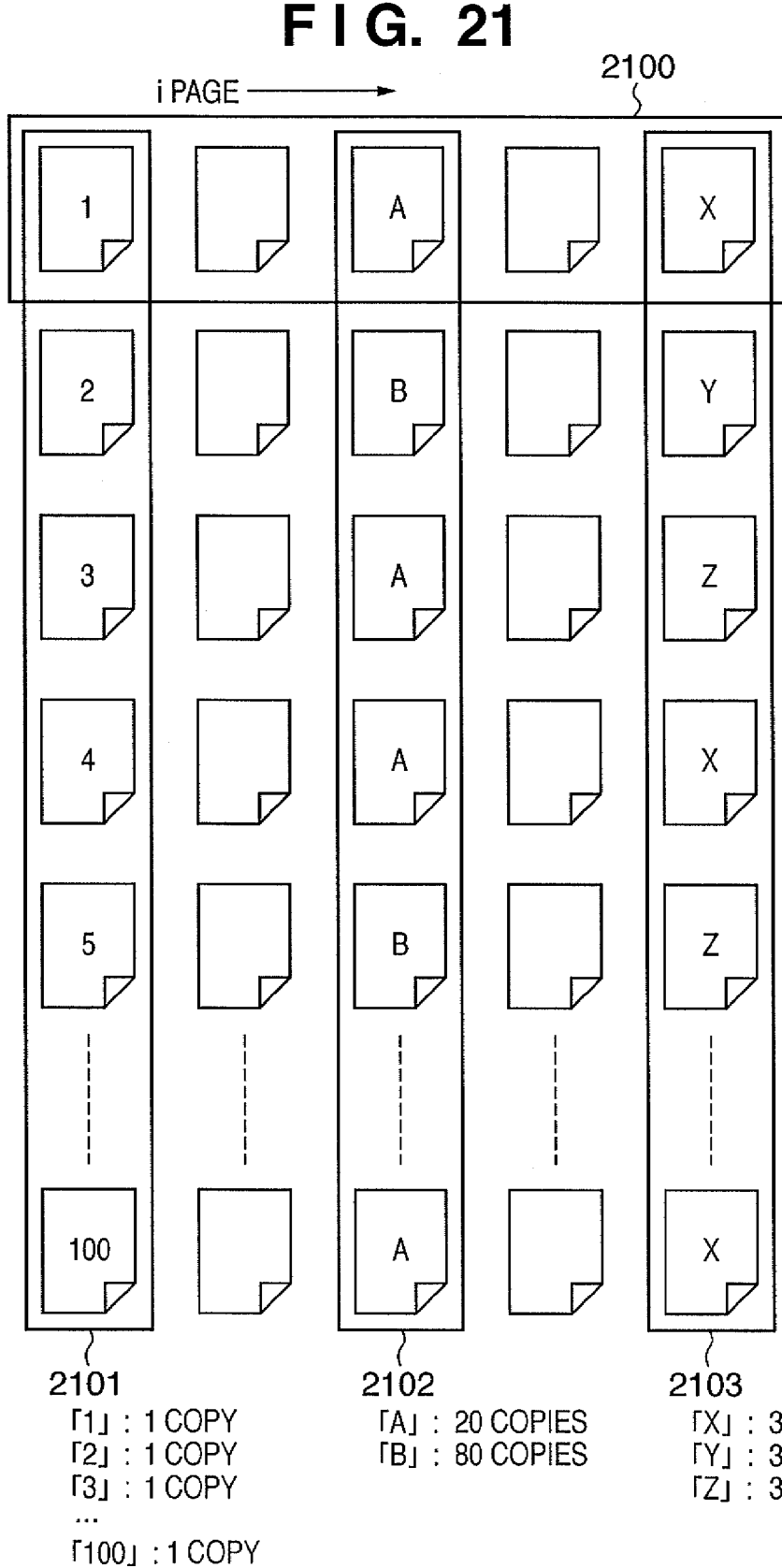
FIG. 21 a view showing an example of the appearance frequency of variable print data according to the second embodiment.

FIG. 21 shows an example of variable printing in which the same data is repeated.

In FIG. 21, for example, one set 2100 in the lateral direction is a set of five pages. Variable print data of each set changes in the longitudinal direction. Reference numerals 2101, 2102 and 2103 denote the first, third and fifth pages containing variable print data. For descriptive convenience, the second embodiment assumes that one page has only one variable printing field. However, even when one page has a plurality of variable printing fields, the same processing as that to be described below can be applied to a combination of the fields.

Different values ("1" to "100" in FIG. 21) are assigned to the first page 2101 in all 100 copies to be output. Values "A" and "B" are assigned to the third page 2102. The number of copies having the value "A" is 20, and the number of copies having the value "B" is 80. Three values "X", "Y" and "Z" are assigned to the fifth page 2103. The number of copies having the value "X" is 32, the number of copies having the value "Y" is 35, and the number of copies having the value "Z" is 33. In the second embodiment, the fifth page 2103 is subjected to selective binding. The sequence of determining which page is subjected to selective binding will be described.

(Example of Selective Binding Determination Sequence)

Figure 22:
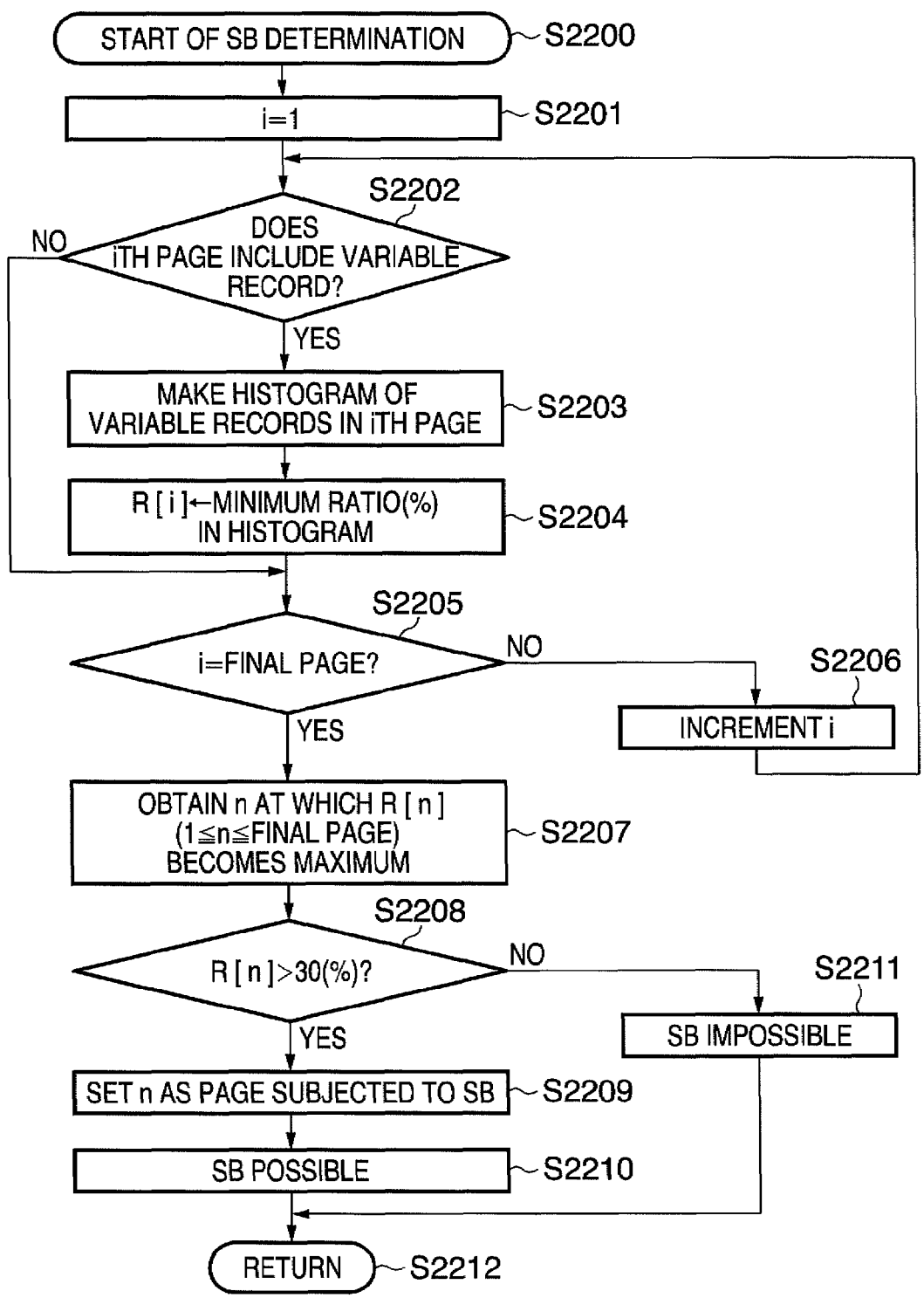
FIG. 22 is a flowchart showing a sequence to determine whether selective binding (SB) is possible/impossible according to the second embodiment.

FIG. 22 is a flowchart showing a processing sequence to determine whether page data edited by an editing display unit 103 contains a page which can be subjected to selective binding, and determine the target page. This processing is executed in S2307 of FIG. 23 based on a data histogram made for each variable print page. This processing may be done during or after page edit processing S602 of FIG. 6.

In step S2200, determination processing starts. In step S2201, a counter variable i representing a page is initialized to indicate the first page. In step S2202, it is determined whether the ith page includes a variable printing field. If the ith page includes a variable printing field (YES in S2202), the process advances to step S2203. If the ith page does not include a variable printing field (NO in S2202), the process advances to step S2205 to skip the following two processes.

In step S2203, a histogram of variable print data is formed from the number of records of variable print data in the ith page. For example, the ratios of the numbers of output copies having "1", "2", . . . , "100", "A", "B", "X", "Y", and "Z" in FIG. 21 to the total number of copies are calculated. For example, in FIG. 21, the histogram of the first page reveals that each of 100 records exists at 1%.

In step S2204, the lowest ratio among the calculated histograms is selected for each page and set in a variable R[i]. R is an array variable, and i is a suffix to the variable R that represents a page corresponding to the variable R. For example, in FIG. 21, the minimum value of the first page 2101 is 1%, the minimum value of the third page 2102 is 20% for "A", and the minimum value of the fifth page 2103 is 32% for "X".

In step S2205, it is determined whether the histogram has been made for up to the final page. If the histogram has been made for up to the final page (YES in S2205), the process advances to step S2207. If the histogram has not been made for up to the final page (NO in S2205), the process advances to step S2206. In step S2206, the variable i is incremented to make the histogram for the next page. After that, the process returns to step S2202.

In step S2207, the maximum value among the calculated minimum ratios for respective pages is obtained. For example, a maximum value in the array variable R[i] and a page number having the maximum value are obtained. When a plurality of pages have the same maximum value, only one page, for example, the first hit page is selected from them. For example, in FIG. 21, the fifth page 2103 has a maximum value of 32%, and this maximum value is selected.

In step S2208, it is determined whether the maximum value obtained in step S2207 is larger than a predetermined threshold. In the second embodiment, this threshold is set to 30%. If the maximum value is larger than the threshold (YES in S2208), the process advances to step S2209. If the maximum value is equal to or smaller than the threshold (NO in S2208), the process advances to step S2211. For example, in FIG. 21, "32%" of the fifth page 2103 exceeds the threshold, and thus the process advances to step S2209.

In step S2209, a page number having the maximum value obtained in step S2207 is set as a page subjected to selective binding. In step S2210, the result of the determination processing in FIG. 22 is set to "selective binding is possible", and then the process ends. In step S2211, the result of the determination processing is set to "selective binding is impossible", and the process ends.

<Example of Page Segmentation Processing Sequence Compliant with Selective Binding>

A page segmentation processing sequence compliant with selective binding will be described.

Figure 23:
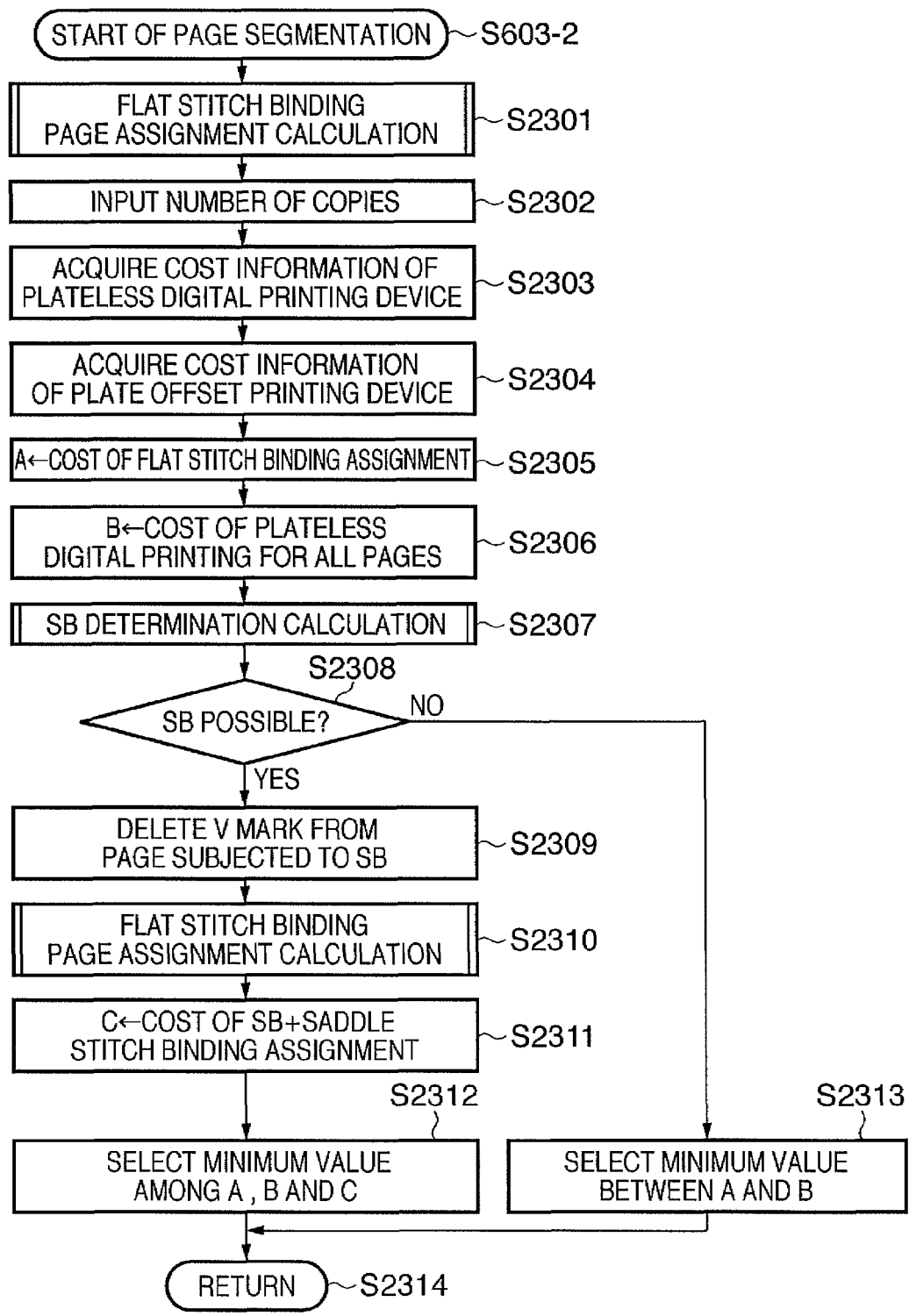
FIG. 23 is a flowchart showing a sequence according to the second embodiment in page segmentation processing S603 of FIG. 6.

FIG. 23 is a flowchart showing a sequence in page segmentation processing S603 of FIG. 6 according to the second embodiment. FIG. 23 shows a processing sequence corresponding to FIGS. 7 and 16 in the first embodiment. In step S603-2, page segmentation processing starts.

In step S2301, page assignment calculation is executed on the condition that flat stitch binding is performed. In step S2302, the number of copies is input. In step S2303, cost information when a plateless digital printing device 115 prints is acquired from a MIS 120 via an information gathering unit 105. In step S2304, cost information when a plate offset printing device 114 prints is acquired.

In step S2305, the cost of the flat stitch binding assignment is calculated and set in an internal variable "A." In step S2306, the cost when the plateless digital printing device 115 prints all pages is calculated and set in an internal variable "B."

In step S2307, determination calculation of selective binding described with reference to FIG. 22 is done. In step S2308, the process branches based on the calculation result (in step S2307) of whether selective binding is possible or impossible. If selective binding is possible (YES in S2308), the process advances to step S2309. If selective binding is impossible (NO in S2308), the process advances to step S2313.

In step S2309, information of a variable printing mark "V" attached to a selective binding page obtained by the calculation in step S2307 is deleted. In step S2310, page assignment calculation is executed again on condition that flat stitch binding is performed. In step S2311, the cost of flat stitch binding page assignment compliant with the calculation result, that is, selective binding is calculated and set in an internal variable "C."

In step S2312, the minimum cost among the internal variables A, B and C is selected, and a assignment method corresponding to the minimum cost is selected. In step S2313, the minimum cost between the internal variables A and B is selected, and a assignment method corresponding to the minimum cost is selected.

Effects of Second Embodiment

As described above, the appearance frequency of variable data is checked and reflected in reference information of page segmentation. Hence, selective binding in plate offset printing can also be selected.

When the same data repetitively appears in a field in variable printing, pages having this data are assigned not to plateless digital printing but to plate offset printing. A job which can further reduce the cost can be generated.

In the second embodiment, FIG. 23 exemplifies only a combination of selective binding and flat stitch binding in order to explain different processing in selective binding. However, an optimum combination may also be selected from combinations with saddle stitch binding and flat stitch binding. This can easily be achieved by combining FIGS. 7, 16 and 23. In this case, the costs of saddle stitch binding, saddle stitch binding+selective binding, flat stitch binding, flat stitch binding+selective binding, and plateless digital printing for all pages are compared.

Third Embodiment

A printing and binding system according to the third embodiment of the present invention will be described.

Only a difference between the third embodiment and the first embodiment will be described.

<Example of Overall Device Configuration of Printing and Binding System According to Third Embodiment>

Figure 24:
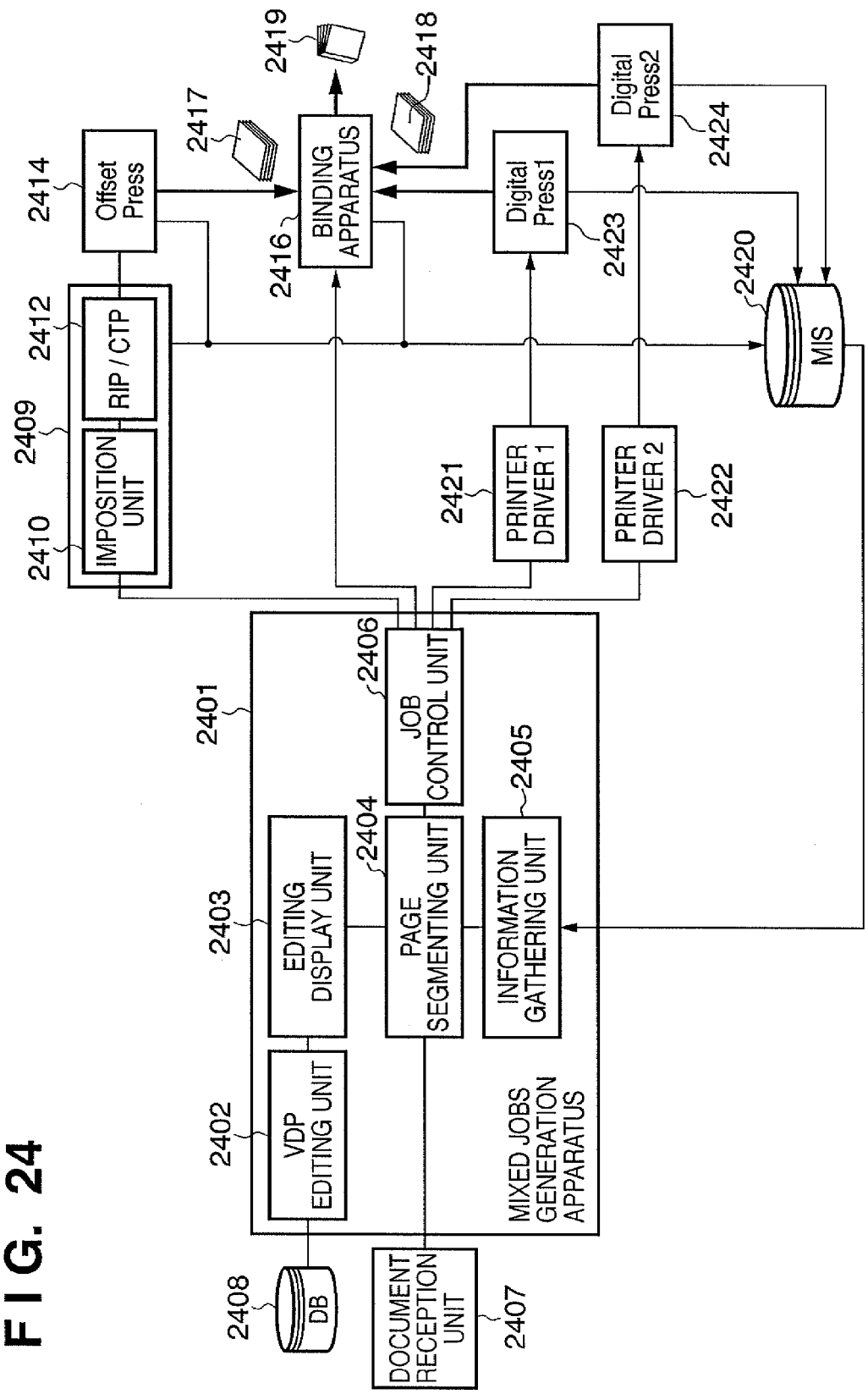
FIG. 24 is a block diagram showing the overall configuration of a printing and binding system according to the third embodiment.

FIG. 24 is a block diagram showing an overall device configuration of the printing and binding system according to the third embodiment. In FIG. 24, the same reference numerals at two lower digits as those in FIG. 1A in the first embodiment denote the same building components, and a description thereof will not be repeated.

In the first embodiment, one plateless digital printing device is connected, and page segmentation is done in accordance with the ability of the plateless digital printing device. In the third embodiment, a plurality of plateless digital printing devices are connected, and a proper one of them is selected.

In FIG. 24, two plateless digital printing devices are connected. Reference numeral 2423 denotes a plateless digital printing device ("Press" in FIG. 24), and 2424 denotes another plateless digital printing device. A MIS 120 holds the processing abilities and operation record information of these plateless digital printing devices. Reference numeral 2421 denotes a printer driver connected to the plateless digital printing device 2423, and 2422 denotes a printer driver connected to the plateless digital printing device 2424.

<Example of Plateless Digital Printing Device Selection Sequence According to Third Embodiment>

Page segmentation processing and distribution of page data to the press according to the third embodiment will be explained.

Figure 25:
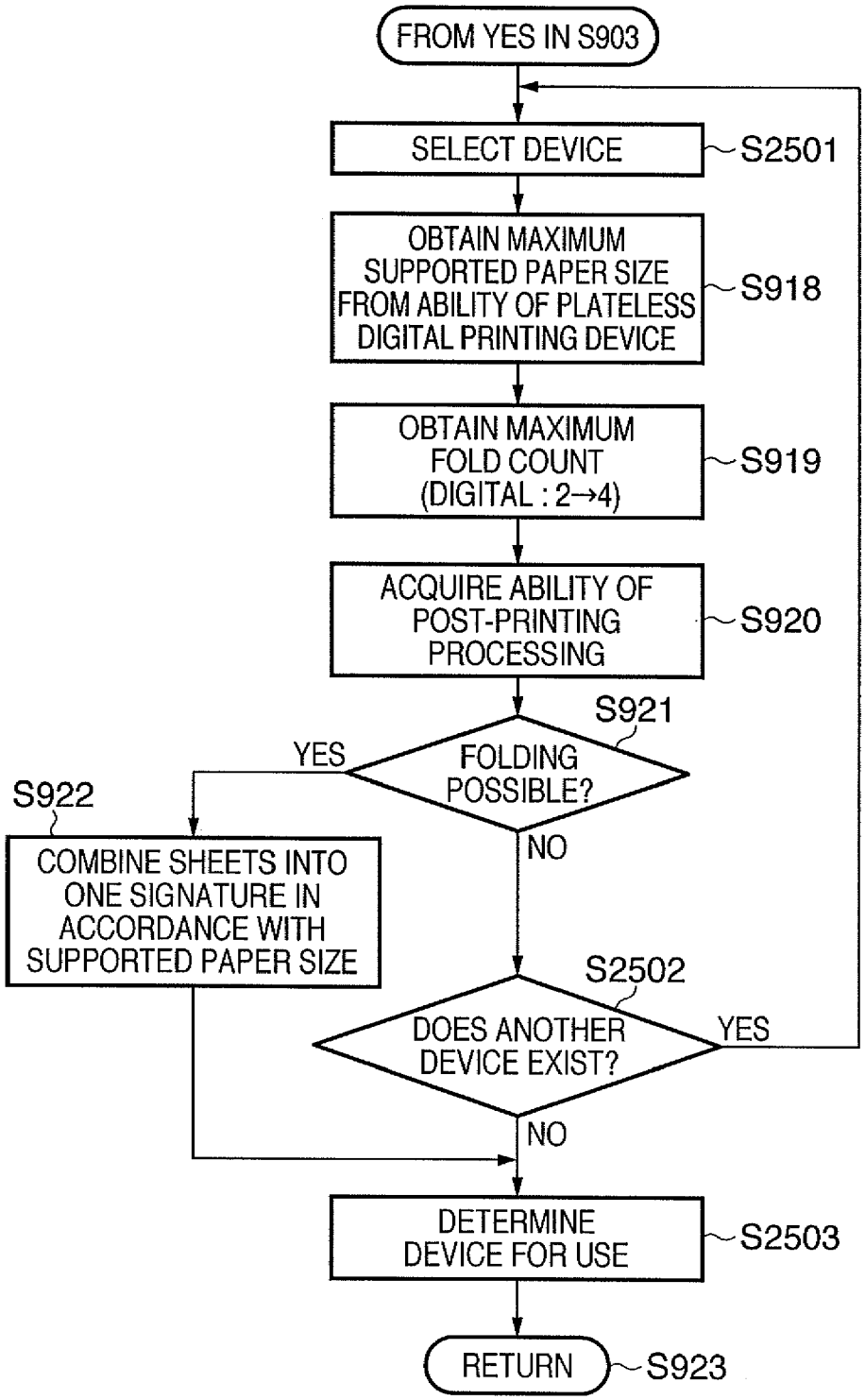
FIG. 25 is a flowchart showing a part of sequence changed from flat stitch binding page assignment calculation S702 in FIG. 9 according to the third embodiment.

FIG. 25 is a flowchart showing part of a processing sequence to perform flat stitch binding page assignment calculation according to the third embodiment. FIG. 25 shows processing branched from "YES" in S903 of FIG. 9 in the first embodiment. In FIG. 9, after the end of the first page assignment for flat stitch binding, optimization for plateless digital printing is executed from step S918.

Before step S918 in FIG. 25, one of connected plateless digital printing devices is selected in step S2501. In steps S918 to S921 of FIG. 25, the ability of the plateless digital printing device selected in step S2501 is determined, similar to FIG. 9.

If it is determined in step S921 that folding is impossible (NO in S921), it is determined in step S2502 whether another plateless digital printing device exists. If the other plateless digital printing device exists (YES in S2502), the process returns to step S2501 to repetitively determine the ability of the other printing device. If the other plateless digital printing device does not exist (NO in S2502), the process advances to step S2503.

If it is determined in step S921 that folding is possible (YES in S921), sections are combined in step S922.

In step S2503, a plateless digital printing device for which the determination has been made is determined as a printing device for use.

The determined printing device is a target device which is to receive a range of pages for plateless digital printing in step S608 of FIG. 6. This printing device is also subjected to determination (step S1606) of whether folding is possible or impossible, and subsequent steps of FIG. 16.

Effects of Third Embodiment

As described above, when determining the ability of a plateless digital printing device in page assignment, the abilities of devices are checked to select a device capable of processing. An appropriate plateless digital printing device which copes with a necessary paper size can be selected. Even when a plurality of devices are connected, mixed jobs can be generated effectively.

In the third embodiment, processing to select a plateless digital printing device for use from a plurality of plateless digital printing devices is integrated into flat stitch binding page assignment calculation processing. It is also possible to integrate the selection processing into another processing or independently execute it without complicating processing.

In the third embodiment, two plateless digital printing devices are connected, but the present invention is not limited to this. It is also effective to select a proper device from three or more devices, or a proper device from pre-presses 109 or plate offset printing devices.

Fourth Embodiment

A printing and binding system according to the fourth embodiment of the present invention will be described.

Only a difference between the fourth embodiment and the first embodiment will be described.

<Example of Overall Device Configuration of Printing and Binding System According to Fourth Embodiment>

Figure 26:
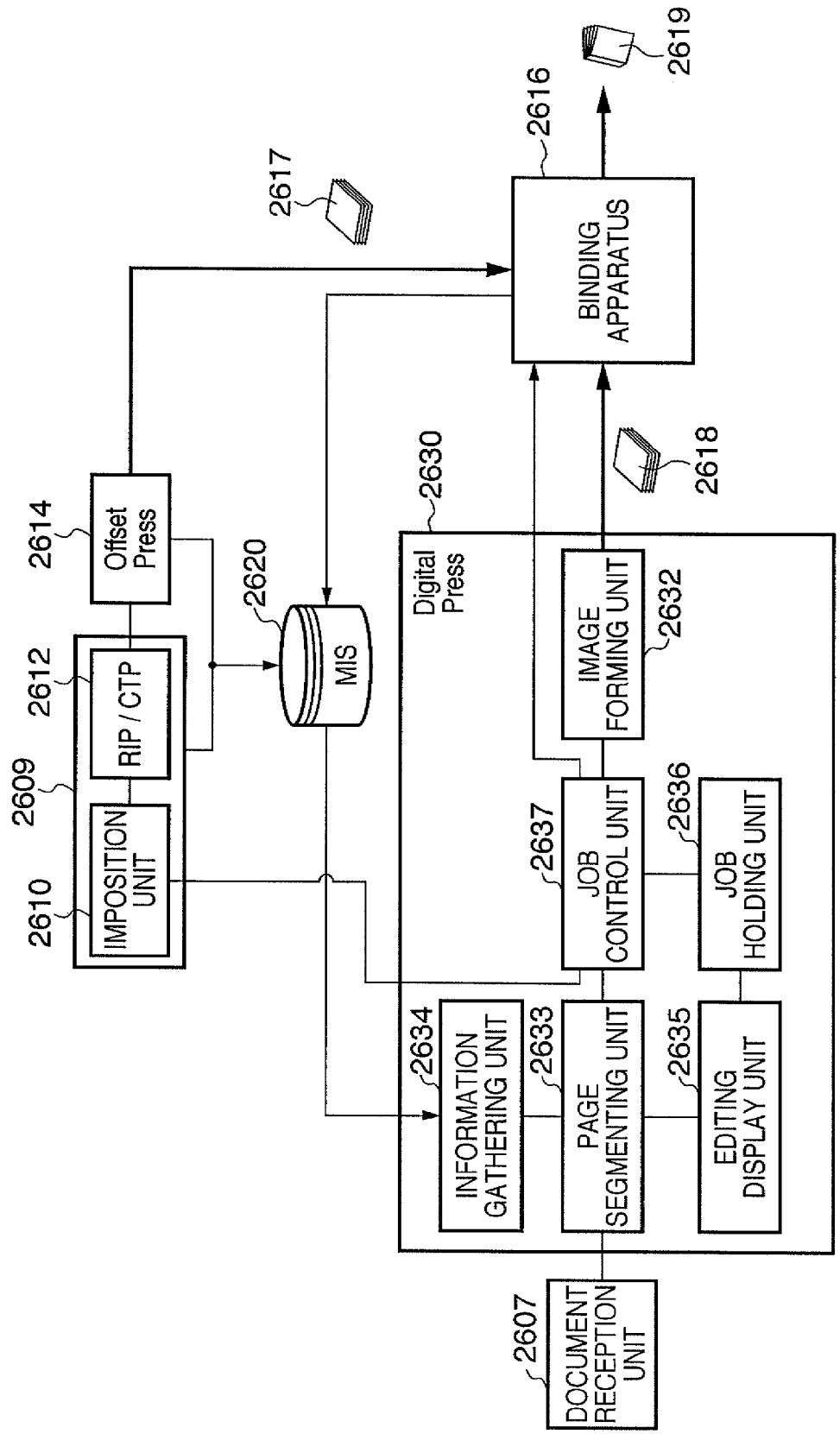
FIG. 26 is a block diagram showing the overall configuration of a printing and binding system according to the fourth embodiment.

FIG. 26 is a block diagram showing an overall device configuration of the printing and binding system according to the fourth embodiment. In FIG. 26, the same reference numerals at two lower digits as those in FIG. 1A in the first embodiment denote the same building components, and a description thereof will not be repeated.

Reference numeral 2630 denotes a plateless digital printing device. In the fourth embodiment, the plateless digital printing device 2630 incorporates mixed jobs generation apparatus.

A page segmenting unit 2633 corresponds to the page segmenting unit 104 in FIG. 1A. In the fourth embodiment, the page segmenting unit 2633 receives data of a variable print data format such as PPML from an entry unit 2607. The page segmenting unit 2633 interprets the variable print data format, and determines a page serving as a variable print page.

An information gathering unit 2634 is connected to a MIS 2620. Information on the plateless digital printing device is not acquired via the MIS 2620, but is held in the information gathering unit 2634 itself.

An editing display unit 2635 corresponds to the editing display unit 103 in FIG. 1A. In the fourth embodiment, the page segmenting unit 2633 determines a variable print page from PPML or the like, so the editing display unit 2635 does not perform editing of a variable printing field and the like. Instead, the page segmenting unit 2633 segments pages based on information on a variable print page determined from the variable print data format. The editing display unit 2635 checks and edits an undetermined page, similar to the first embodiment.

A job holding unit 2636 holds pieces of job information including received page data. The job holding unit 2636 temporarily holds page data including pages which have not been entered. The job holding unit 2636 holds job information including page data until the page data is additionally entered, so that the plateless digital printing device 2630 can accept another job.

A job control unit 2637 corresponds to the job control unit 106 in FIG. 1A. The job control unit 2637 temporarily saves, in the job holding unit 2636, job information including pages which have not been entered.

An image forming unit 2632 has the same arrangement as that of a known digital printer. The image forming unit 2632 receives page data and an output instruction in the form of a page description language (PDL), analyzes them, and prints out the page data.

The configuration of the fourth embodiment except for the image forming unit 2632 is obtained by incorporating mixed jobs generation apparatus 101 shown in FIG. 1B in the plateless digital printing device 2630.

<Example of Operation Sequence by Printing and Binding System According to Fourth Embodiment>

An operation sequence by the printing and binding system in the fourth embodiment will be explained.

Figure 27:
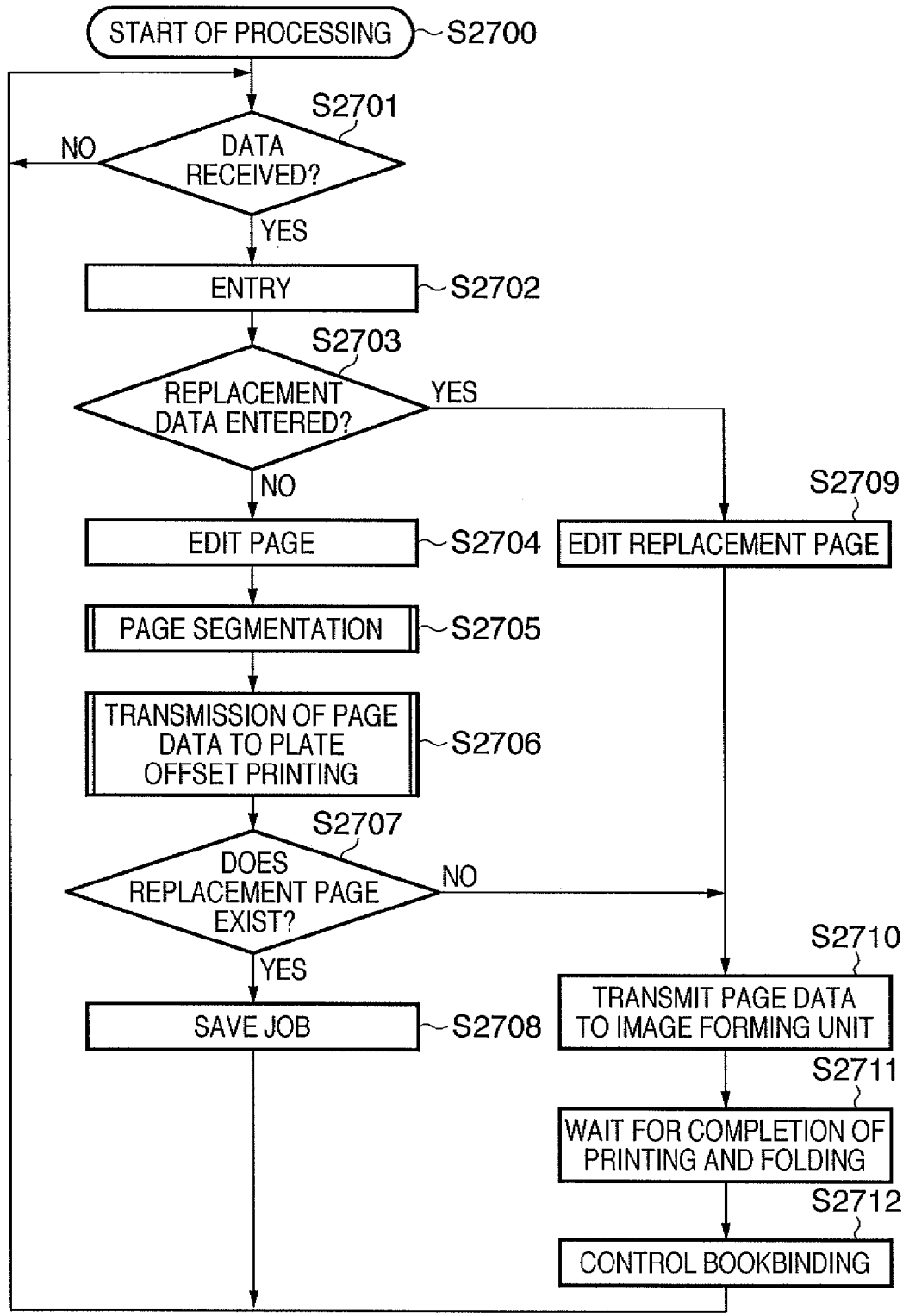
FIG. 27 is a flowchart showing an overall sequence by the printing and binding system according to the fourth embodiment.

FIG. 27 is a flowchart showing a processing sequence by the overall printing and binding system according to the fourth embodiment. This flowchart may also be achieved by centralized control by the plateless digital printing device 2630, similar to FIG. 6, or distributed processing.

In step S2700, the process starts. In step S2701, it is determined whether data has been received. If page data has been received (YES in S2701), the process advances to step S2702. If no page data has been received (NO in S2701), the process returns to step S2701 to wait for reception of data. In step S2702, the page data is received from the document reception unit 2607. At this time, variable print data complies with a variable print data format such as PPML.

In step S2703, it is determined whether the received page data is replaced page data for a previously entered job. If replaced page data has been received (YES in S2703), the process advances to step S2709. If no replaced page data has been received (NO in S2703), the process advances to step S2704.

In step S2704, the page is edited. At this time, a page which has not been received is designated. A variable print page is determined by analyzing the variable print data format such as PPML by the page segmenting unit 2633.

In step S2705, pages are segmented to a range of pages for plate offset printing and a range of pages for plateless digital printing. This processing is the same as that in the flowchart shown in FIG. 7 in the first embodiment.

In step S2706, the range of pages segmented to plate offset printing is transmitted to a pre-press 2609. As for the range of pages for plateless digital printing, it is determined in step S2707 whether a replaced page exists. If a replaced page exists (YES in S2707), the process advances to step S2708. If no replaced page exists (NO in S2707), the process advances to step S2710. In step S2708, the job holding unit 2636 temporarily saves a currently entered job which waits for the replaced page. Then, the process returns to step S2701 to wait for reception of the replaced page.

If the replaced page is received, page data for plateless digital printing is edited by replacing it with the additionally received page data. The job holding unit 2636 saves the resultant page data again, and the process advances to step S2710.

In step S2710, the range of pages for plateless digital printing is transmitted to the image forming unit 2632. In step S2711, the process waits until a plate offset printing device 2614 and the plateless digital printing device 2630 complete printing and section formation by folding assigned in steps S2706 and S2710. Finally in step S2712, a binding apparatus 2616 is instructed to sequentially bind the assigned pages into one book. Thereafter, the process returns to step S2701 to wait for the next job.

<Display Example of Edit Window Unique to Fourth Embodiment>

Figure 28:
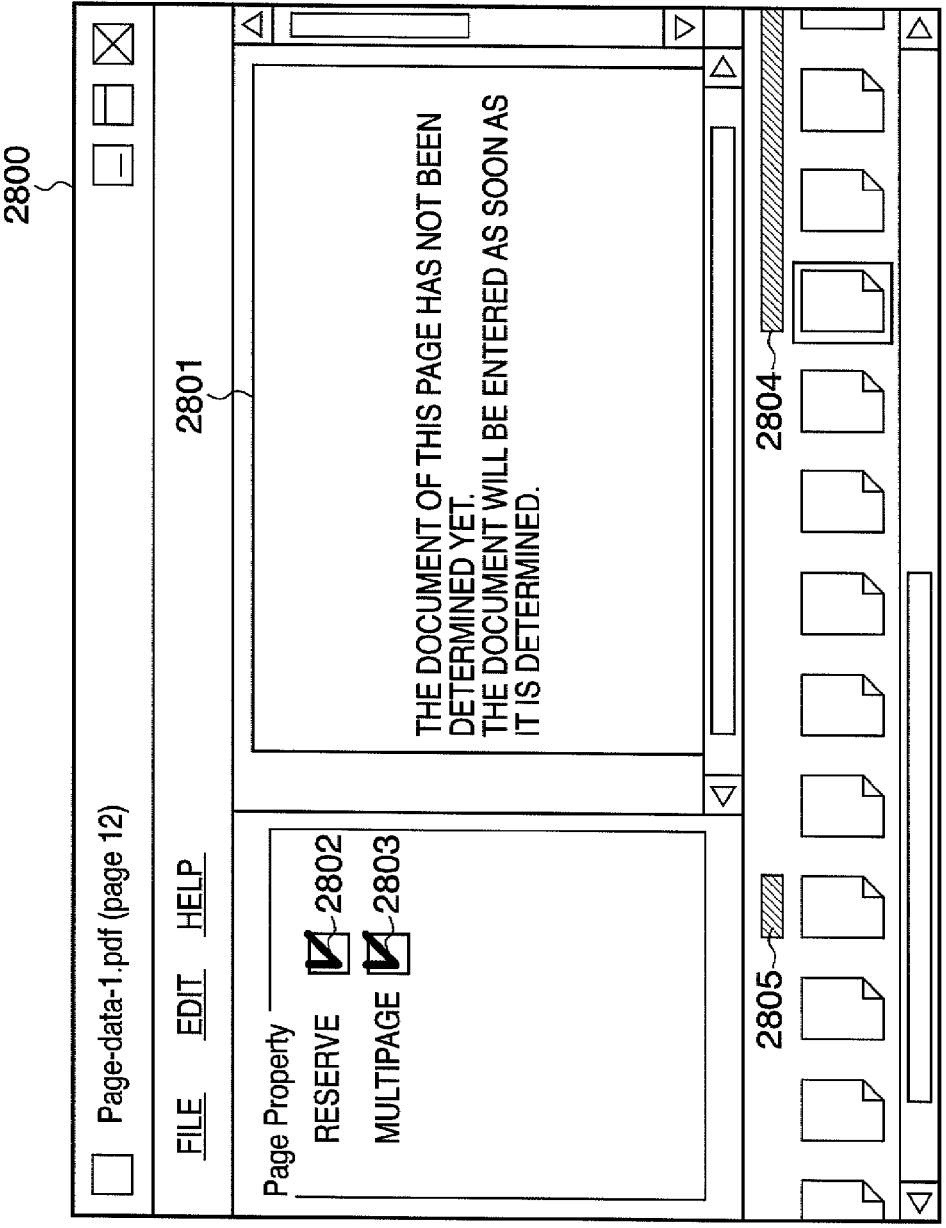
FIG. 28 is a view showing an example of an edit window in which a plurality of undetermined print pages are selected according to the fourth embodiment.

FIG. 28 shows an example of an edit window operable in the editing display unit 2635 in FIG. 26 according to the fourth embodiment. FIG. 28 corresponds to FIG. 20 in the first embodiment. The fourth embodiment omits a function of editing variable printing because a variable print page is determined by interpreting a format such as PPML. In FIG. 28, reference numeral 2800 denotes an edit window. The edit window 2800 displays a selected page. The user sets pages which have not been received, by operating a check box 2802 representing that the document has not been determined, and a check box 2803 representing the possibility at which an undetermined document may be replaced with a plurality of pages. In response to this, the user can confirm a set range of pages from a display such as undetermined page marks 2805 and 2804. Details of this edit window are the same as those in FIG. 20.

Effects of Fourth Embodiment

As described above, the mixed jobs generation apparatus according to the present invention is assembled into the plateless digital printing device. The plateless digital printing device is available as a general digital printer, and can also cope with mixed jobs using plateless digital printing and plate offset printing.

Since the job holding unit is arranged, the plateless digital printing device can also accept another job while waiting for pages which have not been received. This can achieve both the user friendliness of a general digital printer and the advantage of generating mixed jobs.

Fifth Embodiment

A printing and binding system according to the fifth embodiment of the present invention will be described.

Only a difference between the fifth embodiment and the first embodiment will be described.

<Example of Overall Device Configuration of Printing and Binding System According to Fifth Embodiment>

Figure 29:
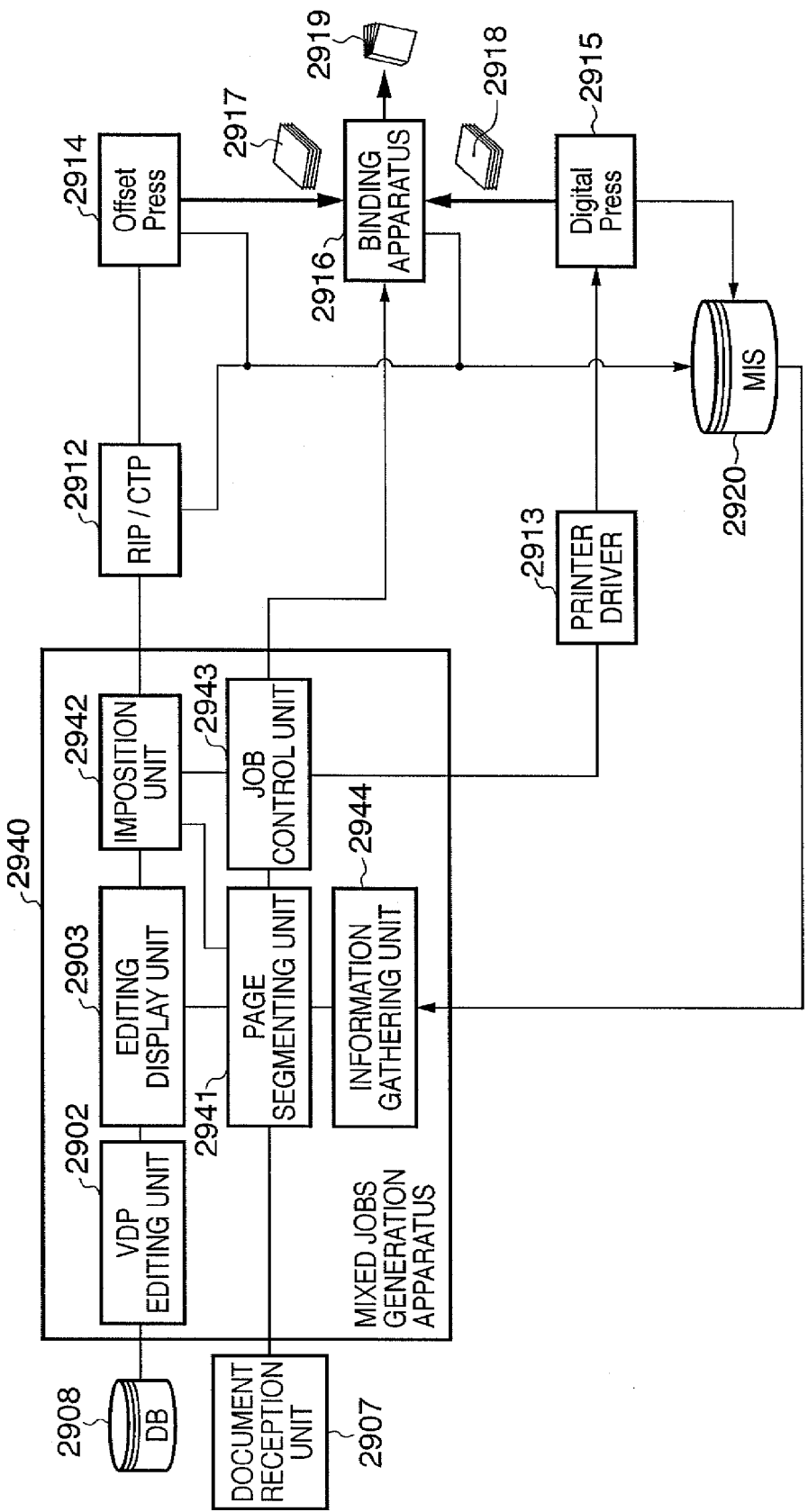
FIG. 29 is a block diagram showing the overall configuration of a printing and binding system according to the fifth embodiment.

FIG. 29 is a block diagram showing an overall device configuration of the printing and binding system according to the fifth embodiment. In FIG. 29, the same reference numerals at two lower digits as those in FIG. 1A in the first embodiment denote the same building components, and a description thereof will not be repeated.

In the fifth embodiment, mixed jobs generation apparatus is assembled into the imposition unit (corresponding to the imposition unit 110 in FIG. 1A) of a pre-press for known plate offset printing.

In FIG. 29, reference numeral 2940 denotes mixed jobs generation apparatus incorporating an imposition unit in plate offset printing. The mixed jobs generation apparatus 2940 incorporating the imposition unit comprises a page segmenting unit 2941, editing display unit 2903, VDP editing unit 2902, information gathering unit 2944, job control unit 2943, and imposition unit 2942.

The page segmenting unit 2941 corresponds to the page segmenting unit 104 in FIG. 1A. In the fifth embodiment, the page segmenting unit 2941 cooperates with the imposition unit 2942 to perform pagination and imposition of a range of pages for plate offset printing. The page segmenting unit 2941 segments pages based on an actually possible imposition layout.

Ability information on the imposition is not acquired via a MIS 2920, but is held in the information gathering unit 2944 itself.

The job control unit 2943 distributes a range of pages for plate offset printing to the imposition unit 2942 in order to perform page processing of the range of pages for offset printing by the mixed jobs generation apparatus 2940 incorporating the imposition unit.

Effects of Fifth Embodiment

As described above, the mixed jobs generation apparatus is configured as part of imposition processing in plate offset printing. A user of a known plate offset printing system can obtain the mixed jobs generation apparatus as a user interface by only additionally connecting a plateless digital printing device. The user can easily introduce the mixed jobs generation system.

Sixth Embodiment

In the first embodiment, FIG. 1C shows an example of a printing and binding instruction job to a binding apparatus, plate offset printing device, and plateless digital printing device.

In the sixth embodiment, an instruction from the document reception unit and instructions to the devices are issued using job tickets in a unified format in the processes of the first to fifth embodiments.

<Example of Job Ticket Sent from Document Reception Unit to Page Segmenting Unit>

FIG. 30 is a view showing an example of a job ticket 3000 sent from a document reception unit to a page segmenting unit according to the sixth embodiment.

The data format in the sixth embodiment is a text document format using a markup language typified by SGML or XML. However, only partial data necessary for a description of the sixth embodiment is simply represented, and the data format does not strictly comply with the specifications of SGML, XML, or the like.

Data shown in FIG. 30 is made up of three lines. The first line <JobTicket> means the start of a data description, and the third line </JobTicket> corresponding to the first line means the end of the data description. According to this tag format, a plurality of lines between a keyword line parenthesized between "<" and ">", and a keyword line parenthesized between "</" and ">/" represent a description corresponding to each keyword. The description <JobTicket> includes a description of one line.

On the first line, a description "id="id_i0"" represents that the identifier of a job indicated by the job ticket is "id_i0". This identifier allows internally identifying a corresponding one of jobs.

On the second line, a description "filename="Page-data-1.pdf"" represents that the file name of input document data of the job indicated by the job ticket is "Page-data-1.pdf". This file name corresponds to, for example, a file name displayed at the position of a page data name and currently edited page number 1801 in the edit window shown in FIG. 18.

The document reception unit in each embodiment described above has a function of generating and transmitting the job ticket shown in FIG. 30. The page segmenting unit in each embodiment has a function of receiving the job ticket shown in FIG. 30 from the document reception unit and segmenting pages.

<Example of Job Ticket Sent from Job Control Unit to Pre-Press>

FIG. 31 is a view showing an example of a job ticket 3100 sent from a job control unit to a pre-press according to the sixth embodiment. FIG. 31 shows a job ticket sent for plate offset printing in correspondence with the page segmentation result shown in FIG. 12. Job tickets in the remaining embodiments also have the same format.

The first line represents that the identifier of a divided job is "id_o1". This identifier is referred to when binding segmented pages into one book.

On the second line, a description "<device name= "offset"/>" represents that the job ticket is sent to a device having a device identifier "offset" which is a plate offset printing device. This identifier corresponds to the plate offset printing device in each embodiment described above.

On the third line, a description "filename="Page-data-1.pdf"" represents that the file name of input document data of the job indicated by the job ticket is "Page-data-1.pdf". This file name is information inherited from the job ticket shown in FIG. 30.

The fourth line describes the order of pages on each section, and designation of a device which performs printing corresponding to this page order. A description "device="offset"" represents that a device "offset" prints a section indicated by the fourth line. A description "page="1 2 3 4 5 6 7 8 9 10 11 12 13 14 15 16"" represents a list of page numbers corresponding to the section indicated by the fourth line. This list corresponds to a range of pages for plate offset printing in FIG. 12. A description "id="sig1"" represents that the identifier of the section is "sig1". The identifier of the section is referred to when binding segmented pages into one book.

The job control unit in each embodiment described above has a function of generating and transmitting the job ticket shown in FIG. 31 in order to control the pre-press in accordance with the page segmentation result. The pre-press in each embodiment has a function of receiving the job ticket shown in FIG. 31 from the job control unit and performing processing to print the section of a designated range of pages.

<Example of Job Ticket Sent from Job Control Unit to Printer Driver>

FIG. 32 is a view showing an example of a job ticket sent from the job control unit to a printer driver according to the sixth embodiment. When a plateless digital printing device can directly accept a job ticket, the job control unit can also transmit a job ticket to the plateless digital printing device.

FIG. 32 shows a job ticket sent for plate offset printing in correspondence with the page segmentation result shown in FIG. 12. Job tickets in the remaining embodiments can also be generated in the same way.

The first line represents that the identifier of a divided job is "id_d2". This identifier is referred to when binding segmented pages into one book.

On the second line, a description "<device name= "digital"/>" represents that the job ticket is sent to a device having a device identifier "digital" which is a plateless digital printing device. This identifier corresponds to the plateless digital printing device in each embodiment described above.

On the third line, a description "filename="Page-data-1.pdf"" represents that the file name of input document data of the job indicated by the job ticket is "Page-data-1.pdf". This file name is information inherited from the job ticket shown in FIG. 30.

The fourth line describes the order of pages on each section, and designation of a device which performs printing corresponding to this page order. A description "device="digital"" represents that a device "digital" prints a section indicated by the fourth line. A description "page="17 18 19 20"" represents a list of page numbers corresponding to the section indicated by the fourth line. This list corresponds to a page range for plateless digital printing in FIG. 12. A description "id="sig2"" represents that the identifier of the section is "sig2". The identifier of the section is referred to when binding segmented pages into one book.

The job ticket shown in FIG. 32 also describes another section indicated by the fifth line. Similar to the fourth line, a section having a page range "21 22 23 24" is sent together with an identifier "sig3" to the device "digital".

The job control unit in each embodiment described above has a function of generating and transmitting the job ticket shown in FIG. 32 in order to control the printer driver in accordance with the page segmentation result. The printer driver in each embodiment has a function of receiving the job ticket shown in FIG. 32 from the job control unit and performing processing to print the section of a designated range of pages. Although the fifth embodiment (see FIG. 26) has not mentioned the printer driver, the job ticket in FIG. 32 may be sent from the job control unit to the image forming unit or the job holding unit may hold a job ticket for plateless digital printing.

<Example of Job Ticket Sent from Job Control Unit to Binding Apparatus>

FIG. 33 is a view showing an example of a job ticket sent from the job control unit to a binding apparatus according to the sixth embodiment. FIG. 33 shows a job ticket sent to the binding apparatus in correspondence with the page segmentation result shown in FIG. 12. Job tickets in the remaining embodiments can also be generated in the same way.

On the second line, a description "<device name= "binder"/>" represents that the job ticket is sent to a device having a device identifier "binder" which is a binding device. This identifier corresponds to the binding apparatus in each embodiment described above.

On the third line, a description "type="stitching"" represents that flat stitch binding is performed. A description "joinlist="id_o1 id_d2"" represents that divided jobs corresponding to the job tickets shown in FIGS. 31 and 32 are joined. A description "idlist="sig1 sig2 sig3"" corresponds to the section identifiers described in the job tickets shown in FIGS. 31 and 32. Bookbinding is executed in the identifier order described in idlist.

The job control unit in each embodiment described above has a function of generating and transmitting the job ticket shown in FIG. 33 in order to control the binding apparatus which binds sections printed in accordance with the page segmentation result. The binding apparatus in each embodiment has a function of receiving the job ticket shown in FIG. 33 from the job control unit and performing final binding processing.

Effects of Sixth Embodiment

As described above, information is transferred between devices using a unified tool "job ticket". This can enhance the extendibility of the system, and can also transfer information via a communication network such as the Internet. By sharing a job ticket, software of each device can also be developed independently.

Seventh Embodiment

In the above-described embodiments, printing and binding are executed by automatically selecting the bind type (flat stitch binding or saddle stitch binding) in terms of the cost and time. In the seventh embodiment, only page assignment is done with a fixed bind type (flat stitch binding or saddle stitch binding) without changing it.

For example, a user may want to generate mixed jobs with a specific binding method, that is, flat stitch binding or saddle stitch binding. To meet this demand, only step S701 or S702 in FIG. 7 may be executed.

The seventh embodiment adopts the same basic arrangement as that in the first embodiment, and only a difference from the first embodiment will be described.

<Example of Page Segmentation Processing Sequence by Page Segmenting Unit According to Seventh Embodiment>

Figure 34:
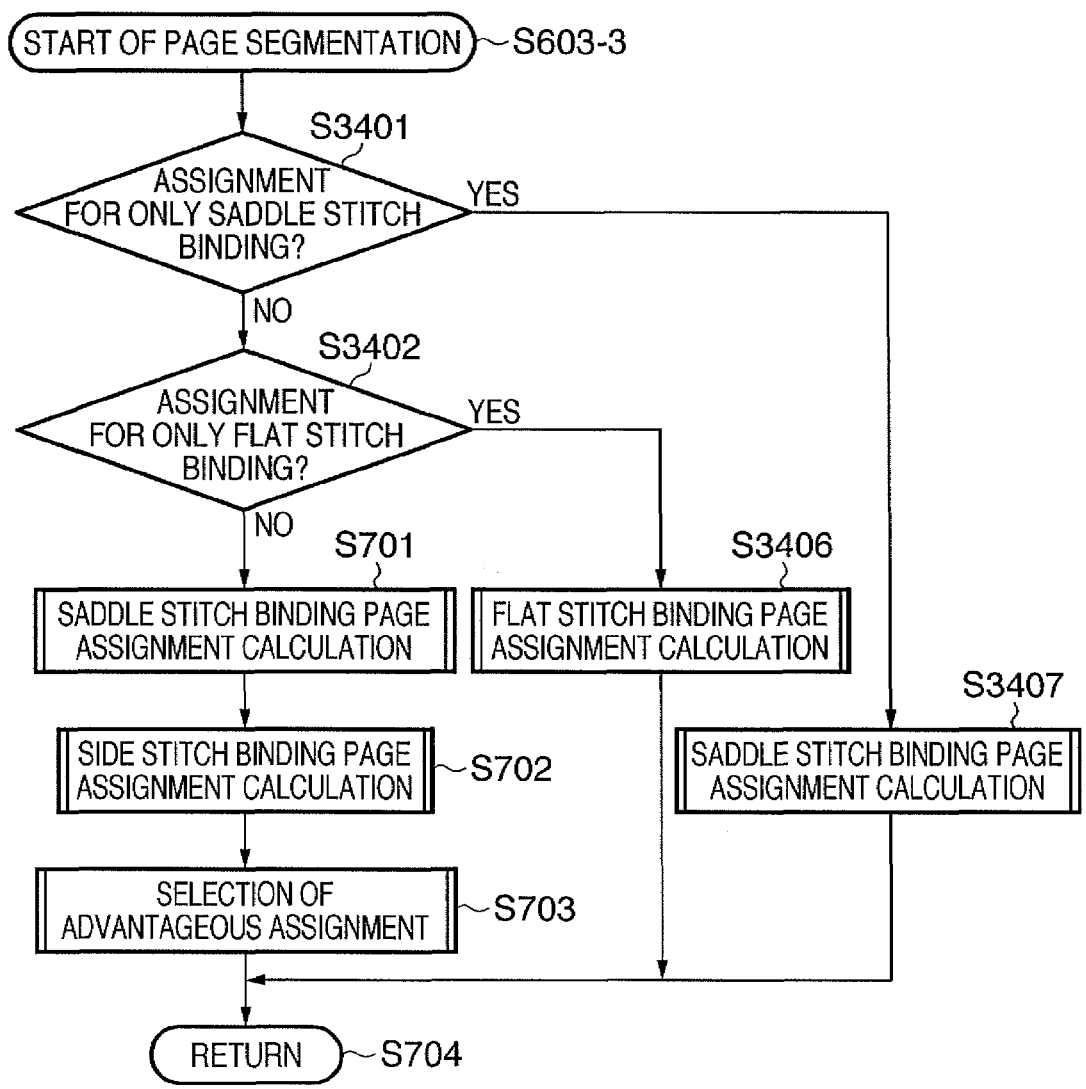
FIG. 34 is a flowchart showing a sequence according to the seventh embodiment in page segmentation processing S603 of FIG. 6.

FIG. 34 is a flowchart showing a processing sequence when the user wants to generate mixed jobs by a specific binding method in page segmentation processing S603 of FIG. 6. In FIG. 34, the same step numerals as those in FIG. 7 denote the same processes. In step S603-1, page segmentation processing starts.

In step S3401, it is determined whether to assign pages for only saddle stitch binding. If pages are to be assigned for only saddle stitch binding (YES in S3401), the process advances to step S3407. If pages are not to be assigned for only saddle stitch binding (NO in S3401), the process advances to step S3402. In step S3407, saddle stitch binding page assignment calculation is executed. This processing is the same as step S701. Then, the process advances to step S704 to return to step S604 in FIG. 6.

In step S3402, it is determined whether to assign pages for only flat stitch binding. If pages are to be assigned for only flat stitch binding (YES in S3402), the process advances to step S3406. If pages are not to be assigned for only flat stitch binding (NO in S3402), the process advances to step S701. In step S3406, flat stitch binding page assignment calculation is executed. This processing is the same as step S702. Then, the process advances to step S704 to return to step S604 in FIG. 6.

The bind type (flat stitch binding or saddle stitch binding) can be designated in page editing processing S602 of FIG. 6 by arranging a designation button or checked box in FIG. 18 or the like.

Effects of Seventh Embodiment

As described above, the bind type (flat stitch binding or saddle stitch binding) can also be designated. This can avoid a situation in which printing and binding are done with a bind type not desired by the user.

The present invention may be applied to a system or integrated apparatus including a plurality of devices (e.g., a host computer, interface device, reader, and printer) or an apparatus formed by a single device.

The object of the present invention is also achieved by supplying a storage medium (or recording medium) which stores software program codes for implementing the functions of the above-described embodiments to a system or apparatus, and reading out and executing the program codes stored in the storage medium by the computer (or the CPU or MPU) of the system or apparatus. In this case, the program codes read out from the storage medium implement the functions of the above-described embodiments, and the storage medium which stores the program codes constitutes the present invention. The functions of the above-described embodiments are implemented when the computer executes the readout program codes. Also, the present invention includes a case where an OS (Operating System) or the like running on the computer performs part or all of actual processing based on the instructions of the program codes and thereby implements the functions of the above-described embodiments.

Furthermore, the present invention includes a case where the functions of the above-described embodiments are implemented as follows. That is, the program codes read out from the storage medium are written in the memory of a function expansion card inserted into the computer or the memory of a function expansion unit connected to the computer. After that, the CPU of the function expansion card or function expansion unit performs part or all of actual processing based on the instructions of the program codes.

When the present invention is applied to the storage medium, the storage medium stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-336383, filed on Dec. 13, 2006, which is hereby incorporated by reference herein in its entirety.

What is claimed is:

1. A mixed jobs generation apparatus for processing input data in which fixed data and variable data are mixed, in a system in which a first printing device for processing fixed data and a second printing device capable of processing variable data are connected, wherein the first printing device includes a plate printing device, the second printing device includes a plateless printing device, data are processed for each print page, and print data for the first printing device includes plate data for making a press plate used in the first printing device, comprising:

a segmentation selection unit for sequentially selecting a plurality of different segmentation methods for input data;

a first calculation unit for calculating, in accordance with the selected different segmentation methods, a plurality of assignments for pages of the input data;

an assignment selection unit for selecting, from the plurality of assignments calculated in said calculating unit, an assignment which satisfies a predetermined condition;

an acquiring unit adapted to acquire a number of pages of fixed data to be printed in succession by the first printing device;

a first generation unit adapted to generate a first job which assigns, in accordance with the selected assignment, as the print data of the first printing device, pages of fixed data to be printed in succession within input data in which fixed data and variable data are mixed, when a number of the pages of fixed data to be printed in succession in the input data exceeds the acquired number of pages of fixed data to be printed in succession by the first printing device;

a second generation unit adapted to generate a second job which assigns, in accordance with the selected assignment, as print data of the second printing device, remaining pages of the input data obtained by excluding the pages of fixed data assigned for the first printing device from the input data;

wherein a memory and a processor are included in the mixed jobs generation apparatus.

2. The apparatus according to claim 1, wherein the plurality of segmentation methods include a segmentation method corresponding to saddle stitch binding of a printing result, and a segmentation method corresponding to flat stitch binding.

3. The apparatus according to claim 2, further comprising: a second selection unit adapted to select, in accordance with an instruction of a user, one processing from a first processing of selecting the segmentation method corresponding to the saddle stitch binding and the segmentation method corresponding to the flat stitch binding, and a second processing of designating either of the segmentation method corresponding to the saddle stitch binding or the segmentation method corresponding to flat stitch binding.

4. The apparatus according to claim 1, wherein the plurality of segmentation methods include a segmentation method using a combination of the first and second jobs, and a segmentation method using only the second job.

5. The apparatus according to claim 1, wherein the plurality of segmentation methods include a segmentation method when a selective binding function of inserting different sections at a same collation position is added to the first printing device, and a segmentation method when the selective binding function is not added.

6. The apparatus according to claim 5, further comprising:
a second calculation unit adapted to calculate frequency of change of print pages including variable data; and
a selective binding unit adapted to exclude a print page having a lowest frequency of change from variable print pages based on the calculation result by the second calculation unit, and perform the selective binding function for the print page.

7. The apparatus according to claim 1, wherein the plate printing device and/or the plateless printing device has functions of performing double-sided printing of a plurality of print pages and forming a section for the plurality of print pages double-sided printed, and a number of pages printable on one sheet by the plate printing device is larger than a number of pages printable on one sheet by the plateless printing device.

8. The apparatus according to claim 1, wherein the assignment selection unit selects an assignment which satisfies a lower cost and/or a shorter processing time.

9. The apparatus according to claim 1, wherein the input data in which fixed data and variable data are mixed is input by a job ticket of a predetermined first format, the first job and the second job are transferred by a job ticket of a predetermined second format, and a third job which designates control of a binding device for binding printouts from the plate printing device and the plateless printing device is transferred by a job ticket of a predetermined third format.

10. A plateless printing apparatus including the mixed jobs generation apparatus according to claim 1, wherein the plateless printing apparatus is the second printing device.

11. A pre-press apparatus which forms a plate of a plate printing device including the mixed jobs generation apparatus according to claim 1, wherein the plate printing device is the first printing device.

12. A method of generating mixed jobs for processing input data in which fixed data and variable data are mixed, in a system in which a first printing device for processing fixed data and a second printing device capable of processing variable data are connected, wherein the first printing device includes a plate printing device, the second printing device includes a plateless printing device, data are processed for each print page, and print data for the first printing device includes plate data for making a press plate used in the first printing device, the method comprising the steps of:

sequentially selecting a plurality of different segmentation methods for input data;

calculating, in accordance with the selected different segmentation methods, a plurality of assignments for pages of the input data;

selecting, from the plurality of assignments calculated in said calculating step, an assignment which satisfies a predetermined condition;

acquiring a number of pages of fixed data to be printed in succession by the first printing device;

generating a first job which assigns, in accordance with the selected assignment, as the print data of the first printing device, pages of fixed data to be printed in succession within the input data in which fixed data and variable data are mixed, when a number of the pages of fixed data to be printed in succession in the input data exceeds the acquired number of pages of fixed data to be printed in succession by the first printing device;

generating a second job which assigns, in accordance with the selected assignment, as print data of the second printing device, remaining pages of the input data obtained by excluding the pages of fixed data assigned for the first printing device from the input data.

13. The method according to claim 12, wherein the plurality of segmentation methods include a segmentation method corresponding to saddle stitch binding of a printing result, and a segmentation method corresponding to flat stitch binding.

14. The method according to claim 13, further comprises a step of selecting, in accordance with an instruction of a user, one processing from a first processing of selecting the segmentation method corresponding to the saddle stitch binding and the segmentation method corresponding to the flat stitch binding, and a second processing of designating either of the segmentation method corresponding to the saddle stitch binding or the segmentation method corresponding to flat stitch binding.

15. The method according to claim 12, wherein the plurality of segmentation methods include a segmentation method using a combination of the first and second jobs, and a segmentation method using only the second job.

16. The method according to claim 12, wherein the plurality of segmentation methods include a segmentation method when a selective binding function of inserting different sections at a same collation position is added to the first printing device, and a segmentation method when the selective binding function is not added.

17. The method according to claim 16, further comprising the steps of:
calculating frequency of change of print pages including variable data; and
excluding a print page having a lowest frequency of change from variable print pages based on the calculation result, and performing the selective binding function for the print page.

18. The method according to claim 12, wherein the plate printing device and/or the plateless printing device has functions of performing double-sided printing of a plurality of print pages and forming a section for the plurality of print pages double-sided printed, and a number of pages printable on one sheet by the plate printing device is larger than a number of pages printable on one sheet by the plateless printing device.

19. The method according to claim 12, wherein in said step of selecting the assignment which satisfies a predetermined condition, an assignment which satisfies a lower cost and/or a shorter processing time is selected.

20. The method according to claim 12, wherein the input data in which fixed data and variable data are mixed is input by a job ticket of a predetermined first format, the first job and the second job are transferred by a job ticket of a predetermined second format, and a third job which designates control of a binding device for binding printouts from the plate printing device and the plateless printing device is transferred by a job ticket of a predetermined third format.

21. A non-transitory computer-readable storage medium which stores a program causing a computer to execute steps of the method of generating mixed jobs according claim 12.

* * * * *